United States Patent
Cintas et al.

(10) Patent No.: US 12,547,899 B2
(45) Date of Patent: Feb. 10, 2026

(54) ARTIFICIAL CONTENT IDENTIFICATION USING SUBSET SCANNING OVER GENERATIVE MODEL ACTIVATIONS

(71) Applicant: International Business Machines Corporation, Armonk, NY (US)

(72) Inventors: Celia Cintas, Nairobi (KE); Skyler Speakman, Nairobi (KE); Girmaw Abebe Tadesse, Nairobi (KE); Victor Abayomi Akinwande, Karen (KE); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 17/090,116

(22) Filed: Nov. 5, 2020

(65) Prior Publication Data
US 2022/0138584 A1    May 5, 2022

(51) Int. Cl.
*G06N 3/088* (2023.01)
*G06N 3/04* (2023.01)
*G06N 3/045* (2023.01)

(52) U.S. Cl.
CPC ............ *G06N 3/088* (2013.01); *G06N 3/045* (2023.01)

(58) Field of Classification Search
CPC ............................... G06N 3/088; G06N 3/045
See application file for complete search history.

(56) References Cited

U.S. PATENT DOCUMENTS

| | | | |
|---|---|---|---|
| 10,325,201 B1 | 6/2019 | Kim | |
| 2018/0336439 A1 | 11/2018 | Kliger | |
| 2019/0236614 A1 | 8/2019 | Burgin | |
| 2019/0302290 A1 | 10/2019 | Alwon | |
| 2020/0160502 A1 | 5/2020 | Niessner | |
| 2021/0012210 A1* | 1/2021 | Sikka | G06N 3/084 |

FOREIGN PATENT DOCUMENTS

| | | |
|---|---|---|
| WO | 2019014487 A1 | 1/2019 |
| WO | 2019068291 A1 | 4/2019 |

OTHER PUBLICATIONS

Vu Nguyen, "Shadow Detection with Conditional Generative Adversarial Networks", IEEE Xplore (Year: 2017).*
Chen, "Generative Adversarial Attributed Network Anomaly Detection", 2020 (Year: 2020).*
Jinyin Chen, "Can Adversarial Network Attack be Defended?", 2019 (Year: 2019).*
Edward McFowland, "Fast Generalized Subset Scan for Anomalous Pattern Detection", 2013 (Year: 2013).*
Speakman, "Subset Scanning Over Neural Network Activations", 2018 (Year: 2018).*

(Continued)

*Primary Examiner* — Van C Mang
(74) *Attorney, Agent, or Firm* — Heather Schuler

(57) ABSTRACT

A processor may receive input data. The processor may train a first machine learning model with the input data to extract a group of activation nodes. The processor may extract the group of activation nodes. The processor may detect anomalous nodes from the group of activation nodes.

20 Claims, 15 Drawing Sheets

(56) References Cited

OTHER PUBLICATIONS

Cintas, C., et al., "Detecting Adversarial Attacks via Subset Scanning of Autoencoder Activations and Reconstruction Error." Accessed Jul. 29, 2020. 7 pages. Proceedings of the Twenty-Ninth International Joint Conference on Artificial Intelligence Main track. pp. 876-882. Published by IJCAI. https://www.ijcai.org/Proceedings/2020/122.

Guo, J., et al., "Long Text Generation via Adversarial Training with Leaked Information." Accessed Jul. 29, 2020. 8 pages. Published by AAAl.

Hsu, C., et al., "Learning to Detect Fake Face Images in the Wild." Submitted Sep. 24, 2018. Last Revised Oct. 18, 2018 (this version). 4 pages. Published by ARXIV. https://arxiv.org/abs/1809.08754.

Karras, T., et al., "Progressive Growing of GANs for Improved Quality, Stability, and Variation." Published Feb. 26, 2018. 26 pages. Published by ARXIV. https://arxiv.org/abs/1710.10196.

Lee, K., et al., "A Simple Unified Framework for Detecting Out-of-Distribution Samples and Adversarial Attacks." Accessed Jul. 29, 2020. 11 pages. In Advances in Neural Information Processing Systems (pp. 7167-7177). https://papers.hips.cc/paper/7947-a-simple-unified-framework-for-detecting-out-of-distribution-samples-and-adversarial-attacks.pdf.

McFowland, E., et al., "Fast Generalized Subset Scan for Anomalous Pattern Detection." Published Jun. 2013. 29 pages. Journal of Machine Learning Research 14 (2013) pp. 1533-1561. Published by JMLR. http://www.jmlr.org/papers/v14/mcfowland13a.html.

Mell, et al., "The NIST Definition of Cloud Computing," Recommendations of the National Institute of Standards and Technology, U.S. Department of Commerce, Special Publication 800-145, Sep. 2011, 7 pgs.

Satter, R. "Experts: Spy used AI-generated face to connect with targets." Published Jun. 13, 2019. Accessed Jul. 29, 2020. 3 pages. Published by AP News. https://apnews.com/bc2f19097a4c4fffaa00de6770b8a60d.

Vondrick, C., et al., "Generating Videos with Scene Dynamics." Published Oct. 26, 2016. 10 pages. Published by ARXIV. https://arxiv.org/abs/1609.02612.

Wang, R., et al., "FakeSpotter: A Simple yet Robust Baseline for Spotting AI-Synthesized Fake Faces ." Accessed Jul. 29, 2020. 8 pages. Proceedings of the Twenty-Ninth International Joint Conference on Artificial Intelligence Main track. pp. 3444-3451. Published by IJCAI. https://www.ijcai.org/Proceedings/2020/476.

Yang, L., et al., "MidiNet: A Convolutional Generative Adversarial Network for Symbolic-domain Music Generation." Published Jul. 18, 2017. 8 pages. Published by ARXIV. https://arxiv.org/abs/1703.10847.

Zhang, X., et al., "Detecting and Simulating Artifacts in GAN Fake Images (Extended Version)." Published Oct. 15, 2019. 10 pages. Published by ARXIV. https://arxiv.org/abs/1907.06515.

\* cited by examiner

ARTIFICIAL CONTENT IDENTIFICATION USING SUBSET SCANNING OVER GENERATIVE MODEL ACTIVATIONS

BACKGROUND

The present disclosure relates generally to the field of data classification and, more specifically, to detecting artificial content.

Techniques, such as deep learning, may be used to generate artificial content such as artificial images, audio, and text. Various concerns may arise as artificial content becomes more realistic because artificial content may be perceived as non-artificial content.

SUMMARY

Embodiments of the present disclosure include a method, a system, and a computer program product for identifying artificial content using subset scanning over generative model activations. An embodiment of the present disclosure for identifying artificial content may include a processor receiving input data. The processor may train a first machine learning model with the input data to extract a group of activation nodes. The processor may extract the group of activation nodes. The processor may detect anomalous nodes from the group of activation nodes, and the anomalous nodes may be extracted.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
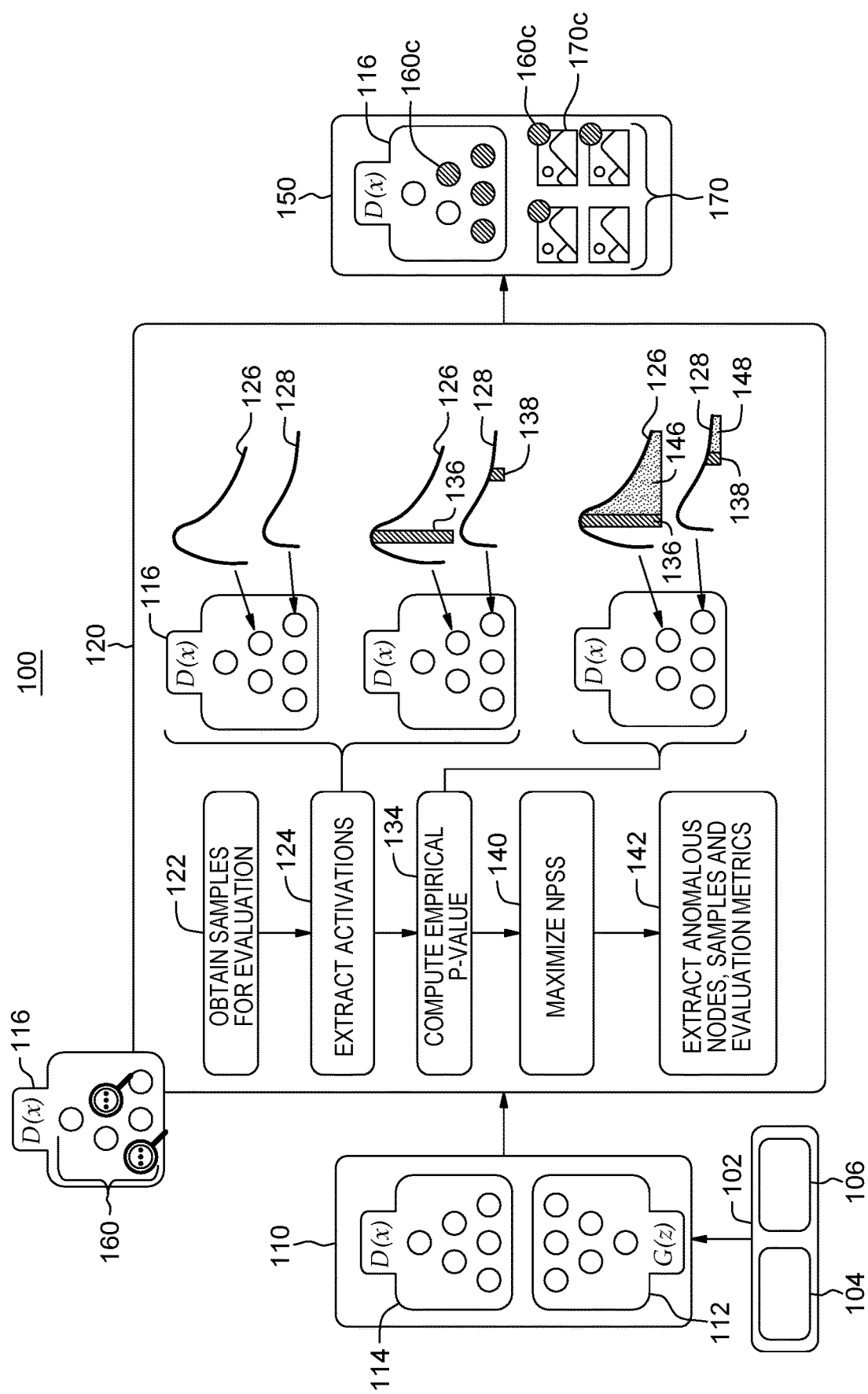
FIG. 1 illustrates an example method of evaluating data, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of data classification and, more specifically, to detecting artificial content. Additional aspects of the present disclosure will be apparent to those skilled in the art. Some of these aspects are described further below.

Embodiments of the present disclosure include a method, system, and computer program product for identifying artificial content using subset scanning over generative model activations. Some embodiments of the method, system, and computer program product for identifying artificial content using subset scanning over generative model activations may include a processor receiving input data. A first machine learning model may be trained with the input data to extract a group of activation nodes, and the group of activation nodes may be extracted. Anomalous nodes may be detected from the group of activation nodes.

Some embodiments of the present disclosure may additionally include applying the first machine learning model on activation data and displaying a determination for the activation data to a user on a graphical user interface.

Some embodiments of the present disclosure may further include updating a generative adversarial network. Updating the generative adversarial network may include obtaining a set of anomalous nodes, generating a gradient mask with the set of anomalous nodes, and updating at least one portion of the generative adversarial network with the gradient mask.

In some embodiments of the present disclosure, the first machine learning model is a discriminator in a generative adversarial network and the generative adversarial network has a network structure that may be updated to an updated network structure. The updated network structure may then be used to enhance at least one process performed by the generative adversarial network.

In some embodiments of the present disclosure, the process enhanced using the updated network structure is a data generation process. The enhancement of the data generation process may include extracting a discriminator structure from the discriminator in the generative adversarial network. A group-based subset scanning may be applied to obtain one or more generative adversarial network metrics. A gradient mask may be generated with one or more of the generative adversarial network metrics. The gradient mask may be applied to the generator of the generative adversarial network to enhance the data generation process.

In some embodiments of the present disclosure, the process enhanced using the updated network structure is a data classification process. The enhancement of the data classification process may include extracting a discriminator structure from the discriminator in the generative adversarial network. A group-based subset scanning may be applied to obtain one or more generative adversarial network metrics. A gradient mask may be generated with one or more of the generative adversarial network metrics. The gradient mask may be applied to the discriminator of the generative adversarial network to enhance the data classification process.

In some embodiments of the present disclosure, the network structure is updated. Updating the network structure may include extracting activations from a layer of the discriminator. Group-based subset scanning over said activations may be applied to obtain anomalous nodes. A gradient mask may be generated with the anomalous nodes and applied to the discriminator. The process of extracting activations, applying group-based subset scanning, generating gradient masks, and applying the gradient masks to the discriminator may be repeated until a threshold is met.

Some embodiments may also include that input data is of a homogenous data type. The homogenous data type may be text, audio, image, or video.

Technological developments have resulted in an increased ability to quickly generate high-quality content such as photo-realistic images synthesized from low-dimensional random noise. While such improvements provide opportunities, they also raise concern regarding the validation of content and have the potential to credibly spread misinformation. Therefore, it is important to be able to detect artificial or altered content and distinguish artificial or altered data from natural or authentic data.

The present disclosure discusses analyzing content. Content is available from diverse sources and of assorted data types, including sources from which it is not feasible to obtain labeled datasets for independently training targeted detectors to analyze the content and of data types for which labeled datasets for training may not be readily available. The present disclosure offers a method, system, and computer program product agnostic to the data it analyzes such that it may analyze any type of data.

It may be beneficial to describe certain terms relevant to the disclosure.

A node is a unit of data structure that contains data and represents the data it contains. A node may link to one or more other nodes. Nodes may be organized into data structures such as linked lists or tree structures. Nodes come in many different types and with many different properties. Nodes are generally defined by how they interact with other nodes, such as that parent nodes have children nodes. Data contained in nodes may be of many different varieties and types.

Nodes may form a neural network, also referred to as a network. A network nay be used for modeling, such as predictive modeling, as well as other applications including adaptive control. Networks are often useful for applications in which the network can be trained with a dataset. Some networks are designed for self-learning such that the experience of a network can result in the network being able to derive conclusions from information. Some networks are able to draw conclusions from complex and seemingly unrelated information.

Arrangement of nodes may define a network structure. A network structure is the arrangement of data into interconnected groupings of information according to the relationships between the interconnected groupings. A network structure may be updated. Updating a network structure involves changing the connections between nodes. An updated network structure may be more optimized, for example, to retrieve relevant data for a query more efficiently or to otherwise enable the updated network structure to perform a task better.

A generative adversarial network (GAN) is a type of network. A GAN is a machine learning (ML) framework in which parts of the network compete with each other. A GAN may have two components: a generator and a discriminator. The generator generates data; the data generated by the generator is artificial data; the generator often attempts to mimic natural data. Data may be submitted to the discriminator. Data fed to the discriminator may be natural or artificial; artificial data fed to the discriminator may be generated by the generator or acquired from one or more other sources. The discriminator attempts to properly detect which data is natural and which data is artificial. If the discriminator properly detects data as either natural or generated, the discriminator wins the competition; if the discriminator fails to properly detect which data is natural and which data is artificial, the generator wins. The competition is zero-sum such that when one part wins the other part loses and vice versa.

GANs may be trained and/or retrained in unsupervised, semi-supervised, fully supervised, or reinforcement learning. Training occurs in turns: either the generator or the discriminator in a GAN may be trained, but to ensure network integrity, the components are typically not trained simultaneously.

When training the generator in a GAN, the generator may produce data and feed it to the discriminator. The goal of the generator is to generate data realistic enough to "trick" the discriminator into believing the generated data is natural. When the discriminator classifies generated data is either natural or generated, the generator may receive the decision as feedback. The generator may integrate the feedback into generating the next set of data it feeds to the discriminator to decrease the likelihood of the discriminator identifying generated data as artificial. As the generator integrates the feedback, the generator may generate data is more likely to "pass the test" administered by the discriminator. This integration of feedback into the generator may be called an update; as an update to the generator is an update to the GAN, the integration of feedback into the generator may be called a network update. An update may improve the quality of the data generated by the generator such that the data becomes more likely to pass the evaluation administered by the discriminator.

The generator may update with every result from the discriminator or in batches thereof to achieve the objective of increasing the error rate of the discriminator. For example, if a generator submits one batch of three datasets to a discriminator, the generator can update its generating algorithm thrice: the first time after the first dataset, the second time after the second dataset, and the third time after the third dataset. Alternatively, the generator could update its generating system once as a batch such that the feedback from the discrimination of datasets one, two, and three all update the generator at the same time. The goal with either update method is the same: to increase the chances that a fourth generated dataset will be accepted by the discriminator as natural. While training the generator, the generator receives feedback and improves its ability to produce generated data that closely resembles natural data. Generally, while training the generator, the discriminator neither receives feedback nor improves. Training the generator enhances data generation and, thereby, the data generated by the generator.

The discriminator in a GAN may also be trained. The goal of the discriminator is to accurately differentiate between natural and artificial data. The discriminator may receive natural data, generated data, or both generated and natural data. When the discriminator categorizes data as natural or artificial, the discriminator may receive feedback as to whether the categorization was correct. If the discriminator properly identifies data as either natural or artificial, the discriminator may receive feedback that the classification was proper; similarly, if the discriminator fails to identify data properly, the discriminator may receive feedback that the classification was improper. The discriminator may integrate feedback to improve its classification ability to better discriminate between generated and natural data. This integration of feedback into the discriminator may be called an update; as an update to the discriminator is an update to the GAN, the integration of feedback into the discriminator may be called a network update. An update may improve the quality of the data classification by the discriminator such that the discriminator data becomes more likely to accurately assess whether data is natural or artificial.

Similar to a generator, a discriminator may update with every result or in batches of results. For example, if a discriminator receives one batch of three datasets, the discriminator can update its classification algorithm thrice: the first time after the first dataset, the second time after the second dataset, and the third time after the third dataset. Alternatively, the discriminator could update its classification system once as a batch such that the feedback from the discrimination of datasets one, two, and three all update the generator at the same time. The goal with either update method is the same: to increase the accuracy of data classification. The objective of the discriminator is the opposite of the objective of the generator: whereas the generator seeks to improve its data generation to increase the chance of the discriminator mis-classifying generated data as natural data, the purpose of training the discriminator is to decrease its own error rate in the classification of data.

While the discriminator trains, the discriminator receives feedback and improves its ability to discriminate between generated and natural data. Generally, while the discriminator trains, the generator neither receives feedback nor improves. Training the discriminator enhances data classification.

A GAN may be updated, also known as retrained, after an initial training. The retraining of the GAN may be similar to the initial training in that either the generator or the discriminator is improved with feedback but the two components are not simultaneously updated. Updates to a GAN may be comprehensive or partial. A comprehensive or full update to a GAN is such that all components are updated; if a GAN is fully updated, both the generator and the discriminator are updated. Alternatively, a GAN may be partially updated such that not all components are updated; a partial update may mean that either the generator or the discriminator is updated, but one of the components is not updated.

A GAN may be trained and/or retrained in unsupervised, semi-supervised, fully supervised, or reinforcement learning fashion. A GAN may be retrained because of a manual decision, such as a user deciding a GAN is to be retrained, or due to a decision being automatically decided, such as because a trigger event occurs.

A trigger event may be any occurrence that prompts an action. For example, a trigger event may be the meeting or exceeding of a predetermined threshold. A predetermined threshold may be met by achieving a specified goal or by failing to achieve a certain goal. For example, a threshold for a generator may be to generate one hundred data samples for a discriminator to evaluate; alternatively, a retraining for a generator may be triggered if the generator fails to achieve an 80% success rate at deceiving the discriminator into classifying its generated data as natural.

A predetermined threshold may be exceeded by crossing a predetermined boundary, regardless of direction; in other words, a threshold may be either a minimum-type value which needs to be surpassed to exceed the threshold or it may be a maximum-type value that a value must fall below to exceed the threshold. For example, a threshold may be that a minimum number of ten volunteers are necessary to work on a certain project such that eleven volunteers exceeds the minimum threshold of ten; in such an example, the commitment of ten volunteers may prompt the action of reserving space at the clinic at which the volunteers intend to work. In another example, a threshold could be that a maximum of fifty students fit on a bus such that classes much be divided in such a way as to have fifty or fewer students allocated to each bus to not exceed the maximum threshold of fifty; in such an example, the allocation of classes among buses such that no bus holds more than fifty students may enable the action of scheduling a field trip.

A null model Mo is, generally, an unbiasedly random structure that generally satisfies a collection of constraints. A null model may be a pattern-generating model based on the randomization of data from a distribution. The data for a null model may be from a known, interpolated, extrapolated, or imagined data distribution. A null model may be used as an object of comparison to assess the likelihood that the properties of a subset of data are the result of either, on the one hand, random chance and the consequence of constraints placed on the dataset or, on the other hand, intentional design or other intervention upon the subset of data. A null model may be derived from a null hypothesis $H_0$. A null hypothesis is a default position that there is no relationship between different measured phenomena; put another way, a null hypothesis is the baseline presumption that nothing anomalous is occurring.

Anomalous nodes are nodes that deviate from the expected deviation of activation. A way to identify anomalous nodes includes calculating p-values. If an observed p-value deviates from a uniform distribution, the node with that p-value is considered anomalous.

A p-value is a quantification of the probability that an observed difference occurred by random chance given a set assumption; the lower a p-value is, the more likely it is that the set assumption is incorrect. Put another way, a p-value is a probability of obtaining results at least as extreme as the observed results of a statistical hypothesis test conducted under the assumption that the null hypothesis is correct; the smaller the p-value, the stronger the evidence is opposing the null hypothesis and in favor of the alternative hypothesis—that something other than random chance is occurring. A p-value may be calculated using area under a curve (AUC). The curve used in an AUC calculation may be a probability distribution curve, a receiving operator characteristic curve, or other similar curve.

Individual p-values may be assessed for whether not they exceed a critical value. A critical value may be used as a threshold for identifying whether an observed value is anomalous or, alternatively, the observed value falls within acceptable parameters of normalcy.

Anomalous pattern detection may include the recognition of groups of anomalous records. Anomalous pattern detection may also include the characterization of the anomalous features of the anomalous pattern. Anomalous pattern detection may be conducted to understand a process that generated the groups of anomalous records. The process that generated the groups of anomalous records may be an anomalous process. A method of anomalous pattern detection may include learning a null model, defining the bounds of a search, choosing a function to score the anomalousness of a subset of data within the search bounds, and optimizing the function to find the highest scoring data subset(s).

A mask, which may also be called a bitmask, is a data filter that may reveal digital information without alterations, reveal data in an altered state, and/or conceal data. A mask may fulfill multiple purposes such as revealing some masked original data, revealing some masked data in an altered state, concealing some masked data, and combinations thereof.

A node filter mask is a type of mask. A node filter mask uses a binary matrix wherein a position is 1 for one type of node and the remaining one or more types of nodes use position 0. A node filter mask may be used to offer feedback, for example, to a GAN regarding relevant node statistics while filtering out undesired or irrelevant data.

An anomalous node mask is a type of node filter mask. An anomalous node mask uses a binary matrix wherein the activation node position is 1 and the non-activation node position is 0. (The positions may also be flipped such that the activation node position is 0 and the non-activation node is 1.) An anomalous node mask is defined by the results of scanning for anomalous nodes. The mask may be used to offer feedback to the GAN, namely, which parts of the GAN would benefit from retraining and which parts of the GAN will not benefit from an upgrade.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure uses a novel anomalous pattern detection technique to determine whether input data is artificially generated data or natural data. Detection of anomalous activations at a set or subset of nodes in accordance with the present disclosure permits classification of data as artificial or anomalous regardless of the data type without labeled dataset training. The present disclosure offers a method, system, and computer program product agnostic to the data it analyzes for anomalousness.

The present disclosure may use a technique which enables a discriminator to better evaluate and classify data without the need to retrain the discriminator on artificial data or artificial data of the evaluated data type. The present disclosure may be likened to training an individual to identify a replica article. A person who identifies replica articles is trained to know what constitutes a legitimate article, such as the feel and the look of an authentic article: a person who identifies replica articles does not need to be trained for on what constitutes a replica article because replica is defined as an article that deviates from the authentic article. In the same way, a discriminator can be trained to distinguish artificial data from authentic data by way of training the discriminator to identify authentic data and be able to recognize any deviations therefrom.

FIG. 1 illustrates an example network 100 of evaluating data in accordance with the present disclosure. Network 100 shows inputs 102 submitted to a GAN 110. GAN 110 includes a generator 112 and a discriminator 114. Input 102 may include a data input 104 and noise input 106. GAN 110 may be conventional, such as an off-the-shelf GAN, or it may be a GAN specifically developed for use in accordance with the present disclosure. GAN 110 may have more than one generator 112 or discriminator 114. GAN 110 may or may not be trained and/or retrained and, if trained and/or retrained, the data used in the training GAN 110 may or may not have included labeled datasets. GAN 110 may internally generate artificial data with generator 112 or internally classify data with discriminator 114.

Discriminator 116 is shown analyzing a group of nodes 160. Discriminator 116 may be part of GAN 110 or independent therefrom; in some embodiments, discriminator 116 is discriminator 114. GAN 110 is shown feeding data to discriminator 116 for discriminator 116 to analyze and categorize; in other embodiments, discriminator 116 may receive data from another source such as, but not limited to, a different GAN, one or more databases, the internet, a hardware-coupled source, a software-coupled source, or an unknown source. Each node $160c$ is affiliated with a sample $170c$.

Discriminator 116 analyzes a group of nodes 160 for anomalous activations. All nodes in the group of nodes 160 may be affiliated with the same sample, some nodes may be affiliated with one or more samples while other nodes are affiliated with one or more other samples, or each node may have a distinct sample among a set of samples 170.

In analyzing data for anomalousness, discriminator 116 first obtains samples 122 for evaluation. Discriminator 116 then extracts activations 124 from the samples to compute empirical p-value values 134. Nonparametric scan statistics (NPSS) are maximized 140. Anomalous nodes, samples, and evaluation metrics are extracted 142 from the maximized NPSS 140. The extracted anomalous nodes of the anomalous nodes, samples, and evaluation metrics 142 are identified in the output 150 of the discriminator 116.

System 120 may obtain samples 122 for evaluation from any source including, but not limited to, a GAN such as GAN 110, an internal source such as a database stored on a device local to discriminator 116, or an external source such as accessed via the internet. Samples may include text, audio, image, video, or a combination thereof. Activations are extracted 124 from the obtained samples 122.

At the extraction of activations 124, discriminator 116 calculates the distribution of activations 126 and 128 from samples at a group of evaluated nodes 160. Two evaluated nodes $160c$ and $160f$ are highlighted for detail. Samples 126 and 128 may be evaluated either independently or cooperatively. Discriminator 116 evaluates sample activations 136 and 138 at evaluated nodes 160. Discriminator 116 computes 134 empirical p-values 146 and 148 at the relevant node. Anomalous nodes, samples, and evaluation metrics are extracted 142. Anomalous nodes, samples, and metrics may be displayed in the output 150 with one or more indicators to identify anomalous activity.

Discriminator 116 computes 134 empirical p-values from samples at evaluated nodes. The present disclosure may treat the detection problem as a search for the most anomalous subset of observations in the data. An exponentially large search space may be efficiently explored by exploiting mathematical properties of the measure of anomalousness.

Given a set of samples $X=\{X_1, \ldots, X_M\}$ and nodes $O=\{O_1, \ldots, O_J\}$ within a discriminator wherein $Xs \subseteq X$ and $O_S \subseteq O$, considered subsets S can be quantified as $S=X_S \times O_S$. As the goal is to discover the most anomalous subsets, the maximum of a score function F defining the anomalousness of a subset of samples and node activations can be used:

$$S^* = \underset{S}{\mathrm{argmax}} F(S)$$

The present disclosure uses an iterative ascent procedure at alternating steps of ascent to identify the most anomalous subset of samples for a fixed subset of nodes. Given the set of samples $X=\{X_1, \ldots, X_M\}$, there are $2^M$ possible subsets of samples $X_S$.

Using the linear-time subset scanning (LTSS) property reduces the possibilities to M subsets while still guaranteeing that the highest scoring subset can be identified. The LTSS property drastically reduces the search space. Using this property, the present disclosure may scale to large networks, groups, and other large databases of samples. LTSS maintains general applicability and decreases the search space from $2^J$ possibilities to J possibilities at each of the remaining steps of the ascent. Iterations converge to a local maximum such that any change to $X_S$, conditioned on subset $O_S$, decreases score function F(S); similarly, any change to $O_S$, conditioned on subset $X_S$, also decreases score function F(S). As the present disclosure uses an iterative ascent process, convergence indicates the final subset of samples. Multiple random restarts may be used to identify a global maximum.

The process of single restart over M test samples and J nodes may also be described as having an input of (M×J) p-values and having an output of scores for $X_S$ and $O_S$. Optimization over rows using LTSS may otherwise be described as having an input of p-values from all rows E and relevant columns C and having an output of the maximum score of a subset.

NPSS may be used in combination to LTSS. NPSS makes minimal assumptions about the underlying distribution of node activations and, as a result, enables an ability to scan across different types of layers and activation functions. To use NPSS on the activation data of a discriminator, the present disclosure uses three steps.

An anomalous node is a node with a p-value that deviates from the uniform distribution. First, to establish a baseline for comparison, a distribution of expected activations 126 and 128 should be formed at each node. A distribution may be generated by enabling the discriminator to process background samples and record the activations at each node. Background samples are samples that are known to be natural/authentic. Activations caused by background samples may be referred to as baseline activations. Second, the activations induced by samples 136 and 138 may be recorded. The sample activations may be compared to the baseline activations. The comparison of the sample activations to the baseline activations results in a p-value 146 and 148 at each node for each sample in the set. Third, to quantify how much the observed distribution of p-values deviates from the uniform distribution, the $X_S$ and $O_S$ that maximize NPSS may be identified.

An empirical p-value 146 and 148 may be calculated as:

$$p_{ij} = \frac{\sum_{z=1}^{|Z|} I(A_{zj}^{H_0} \geq A_{ij}) + 1}{|Z|+1}$$

wherein $p_{ij}$ is the empirical p-value for sample i of node j, Z is the number of real images at each of J nodes, I is the total number of samples, $$A_{zj}^{H_0}$$

is the matrix of activations from z real images at node j given null hypothesis $H_0$, $A_{ij}$ is the matrix of activations induced by M samples in the test set, and wherein:

$$p_{ij}=[p_{min}(p_{ij}), p_{max}(p_{ij})]$$

defines the empirical p-value range.

The present disclosure computes 134 an empirical p-value 146 and 148 for each $A_{ij}$ as a measurement for how anomalous the activation value of a sample $X_i$ is at node $O_j$. The resulting p-value is $p_{ij}$, and $p_{ij}$ is the proportion of activations from the Z background images in $$A_{zj}^{H_0}$$

that are larger or equal to the activation from an evaluation sample at $O_j$. A slight shift ("+1") is added to each the numerator and the denominator so that a test activation larger than all activations from the background samples at a node is given a small, positive p-value. Any test activation smaller than or tied with the smallest background activation at the same node receives a p-value of 1.0.

The subset of samples with the most statistical evidence for being affected by anomalous pattern can be determined by processing the matrix of p-values P from test samples via NPSS to identify submatrix $S=X_S \times O_S$ that maximizes F(S). The general form of the NPSS score function is:

$$F(S) = \max_{\alpha} F_{\alpha}(S) = \max_{\alpha} \phi(\alpha, N_{\alpha}(\alpha, N_{\alpha}(S), N(S))$$

wherein N(S) is the number of empirical p-values in subset S, $\alpha$ is the significance level, and $N_{\alpha}(S)$ is the number of p-values less than the significance level contained in S. For subset S having N(S) empirical p-values, $E[N_{\alpha}(S)]=N(S)\alpha$. Thus, while maximizing NPSS over subsets, the present disclosure finds subset S showing the most evidence of an observed significance higher than an expected significance. Mathematically, the present disclosure finds $N_{\alpha}(S) > N(S)\alpha$ for significance level $\alpha$.

Two statistical tests for generated content detection that may be useful are Berk-Jones, which may also be referred to as the BJ statistic, and Higher Criticism, which may also be referred to as the HC statistic. The Berk-Jones test statistic may be defined as:

$$\phi_{BJ}(\alpha, N_{\alpha}, N) = N * KL\left(\frac{N_{\alpha}}{N}, \alpha\right)$$

wherein KL is the Kullback-Liebler (KL) divergence between observed and expected proportions of significant p-values. The Kullback-Liebler divergence may be quantified as:

$$KL(x, y) = x\log\left(\frac{x}{y}\right) + (1-x)\log\left(\frac{1-x}{1-y}\right)$$

The Berk-Jones statistic may be interpreted as the log-likelihood ratio for testing whether p-values are uniformly distributed. The Higher Criticism statistic may be interpreted as a test statistic of a Wald test for the amount of significant p-values. The Higher Criticism statistic may be defined as:

$$\phi_{HC}(\alpha, N_\alpha, N) = \frac{|N_\alpha - \alpha N|}{\sqrt{N\alpha(1-\alpha)}}$$

wherein $N_\alpha$ is binomially distributed with parameters N and $\alpha$. As a result of the Higher Criticism statistic normalizes by the standard deviation of $N_\alpha$ Higher Criticism tends to return small subsets with extreme p-values.

The present disclosure identifies the anomalous subset of p-values through iterative ascent of two optimization steps. Within each step, the number of subsets under consideration may be reduced from $O^*(2^E)$ subsets to $O^*(E)$ subsets, wherein E is the number of elements optimized, with the application of the LTSS property. Elements optimized may be, for example, samples such as images; elements may also be nodes.

Each element e may be sorted by its priority; the priority of an element is its proportion of p-values less than a set significance level $\alpha$ threshold. The LTSS property states that the highest scoring subsets consist of the top k elements wherein $1 \leq k \leq |E|$. Any subset not consisting of top k priority elements does not need to be further evaluated because it is provably sub-optimal. Any subset that does consist of top k priority elements may be further evaluated.

Upon satisfactory iterations and evaluations, discriminator 116 generates an output 150. The output 150 may include the identification of one or more anomalous nodes 160c. The output 150 may further include one or more samples 170 with which the one or more anomalous nodes 160c are affiliated. The output 150 may include all nodes 160 for all samples evaluated with one or more indicators. Indicators may identify anomalous nodes, provide data about the nodes, specify reasoning for the conclusion of the discriminator as to whether or not a node was anomalous, or a combination thereof. The output 150 may include classic metrics such as precision, recall, and area under the curve.

Data may be anomalous in obvious ways; for example, an image may have a caption asserting it is the portrait of a person when the image is a stick figure. Data may also be anomalous in less obvious ways; for example, an artist could compile several images of a person into a realistic reconstruction of a portrayal of that person.

Artificial content may arise in any medium and from diverse sources. As a result, it is difficult, not feasible, or even impossible to obtain labeled datasets to train an AI model for all possible artificial modalities. The present disclosure is agnostic to data input; that is, the present disclosure may be used with any media without the need to develop a specialized version for each form content may take. As a result of the present disclosure being agnostic to input data, the same approach may be applied to text, images, audio, video, and other media; in other words, the present disclosure does not require training, development, or other specializations for any particular type of media: the same method, system, or computer program product used to classify whether text is artificial may also be used to classify images, audio, video, or any other medium.

Content may be artificially generated in any medium. Examples of media types which content may be artificially generated for include text, audio, images, and video. Artificially generated content may also be generated for mixed media. For example, an artificially generated blog could contain artificially generated images, audio files, and videos. In some cases, artificial content may be used in an otherwise non-artificial compilation, such that an artificially generated video is posted with an article with text that has not been artificially generated. In instances of combinations, content may be scrutinized separately or as a compilation. In other words, identifying whether content is artificial may be done in pieces, such that textual data is evaluated with one process and images with another process, or may be done on the whole, such that the textual data and the images are assessed together.

Figure 2:
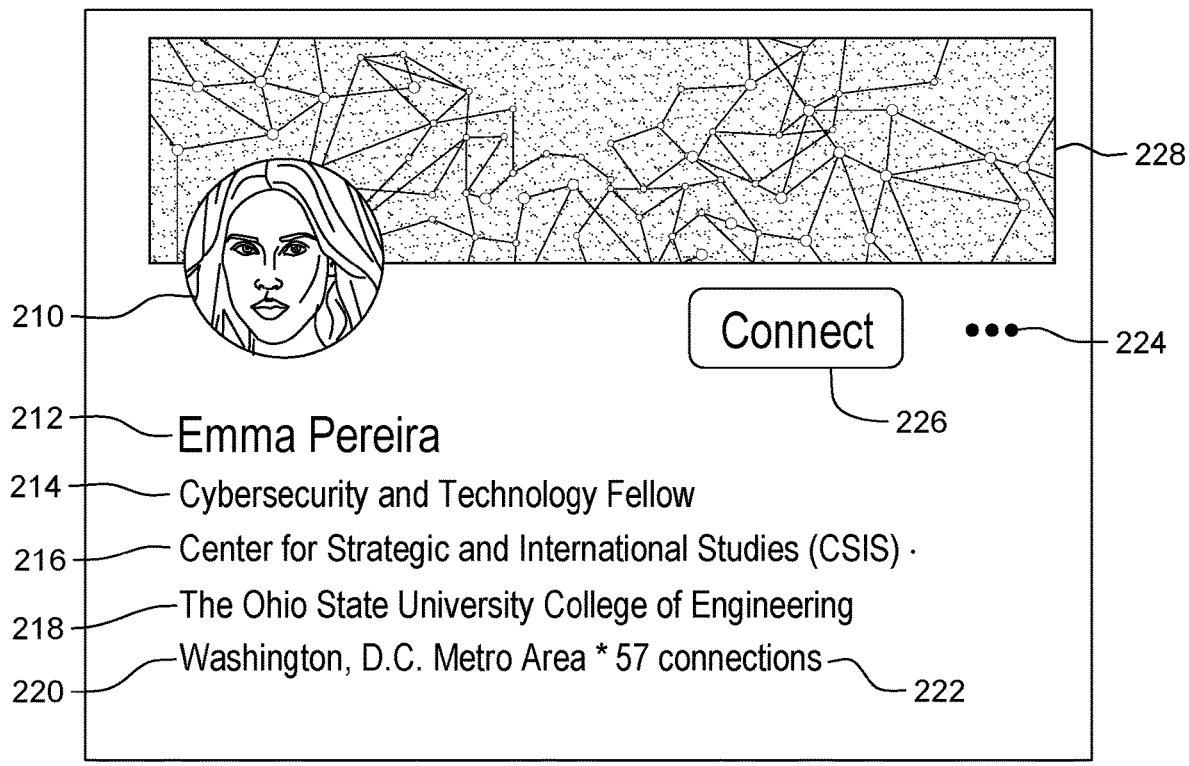
FIG. 2 illustrates an example artificially generated profile on a social media network in accordance with embodiments of the present disclosure.

An example of multiple media combined into one instance of artificially generated content may be a social media network profile containing an artificial profile picture and generated profile data. FIG. 2 illustrates an example artificially generated profile on a social media network, in accordance with embodiments of the present disclosure. Artificial profiles, which are profiles not reflective of a real, live person, have been identified on social networking platforms. Artificial profiles may be generated using software such as a GAN or the generator portion of a GAN. These profiles appear to be legitimate based on information provided and photo-realistic pictures; however, thorough evaluation indicates the profile pictures to have been generated from a computer program. Features indicating a computer-generated image may include, for example, an indistinct background, a portrait cropped closely to the face, jewelry appearing blurry, smudges or drip marks on a cheek, and similar irregularities. The present disclosure provides a method, system, and computer program product for identifying artificially generated content, such as the artificially generated social media profile illustrated in FIG. 2, based on irregular data nodes.

FIG. 2 illustrates an example artificial profile 200. Artificial profile 200 may closely mimic a natural profile by including the same information as would be expected on a natural profile. Information included on an artificial profile 200 may include, for example, a profile picture 210, a name 212, a title 214, a company or organization affiliation 216, educational information such as a school affiliation 218, a location 220, and a number or approximate number of connections 222. Additional details shown on example artificial profile 200 include a menu button 224, a connect button 226, and a background 228.

Figure 3:
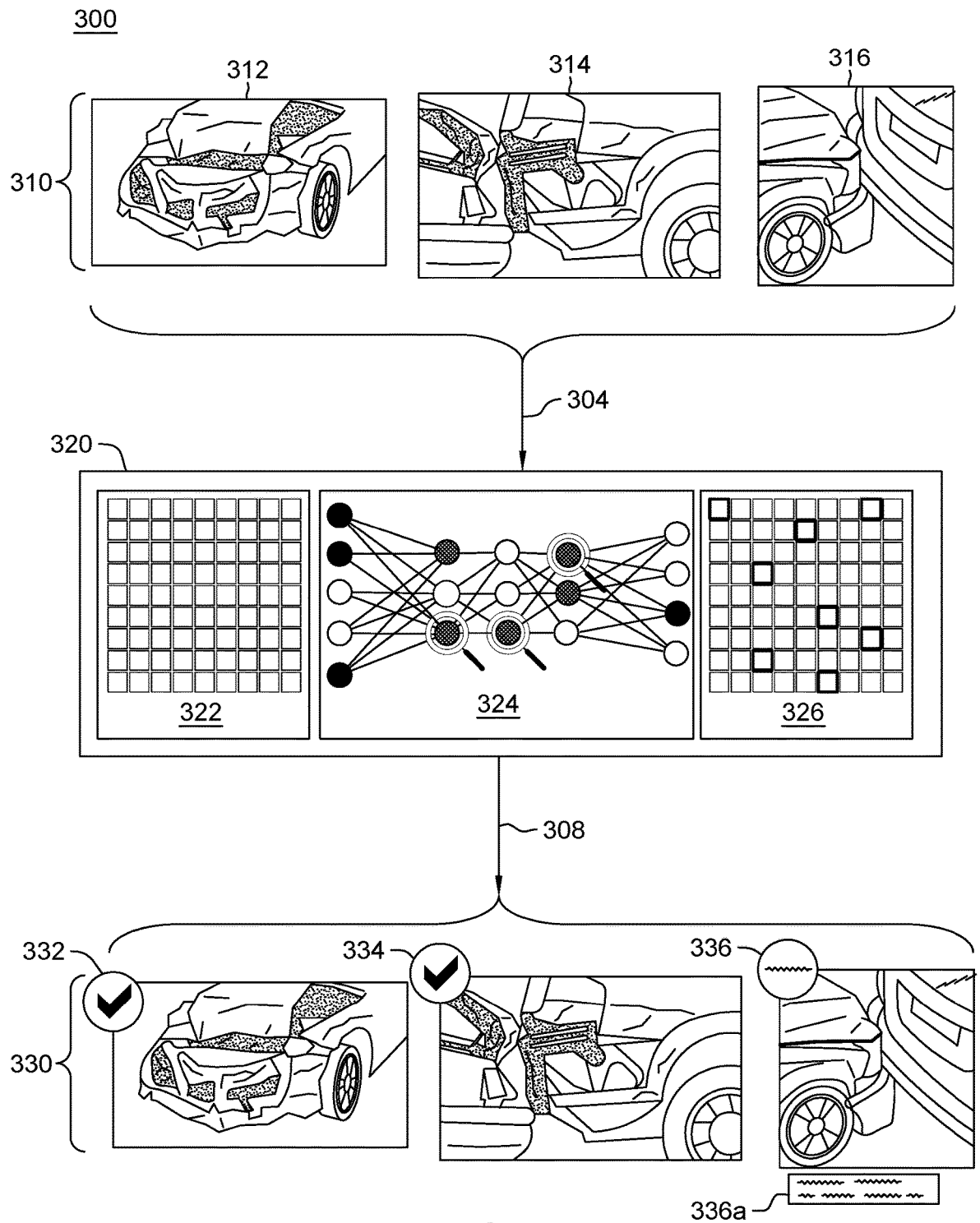
FIG. 3 depicts a data validation process in accordance with embodiments of the present disclosure.

FIG. 3 depicts a data validation process 300, in accordance with embodiments of the present disclosure. In this example, images 312, 314, and 316 are obtained, submitted 304 to an insurance carrier, evaluated 320 for alterations, and evaluated images are returned 308 with authenticity indicators 332, 334, and 336. Images 312, 314, and 316 may be obtained via photographic capture at the scene of an incident.

In some embodiments, a set of images 310 may be submitted 304 to an insurance carrier or other party to evidence damage from a vehicular accident, as exemplarily shown. The set of images 310 shown includes the first image 312 of the front of a vehicle in the accident, the second image 314 of the side of a vehicle involved in an accident, and the third image 316 of two vehicles involved in the accident. The set of images 310 may be submitted 304 to an insurance carrier or a third party for evaluation 320. Evaluation 320 may be completed by scanning the images for anomalous nodes, as discussed further herein. The tool used for evaluation 320 may receive 322 the set of images 310 and scan 324 the images 310 for anomalies. Anomalies may be identified 326 using the present disclosure.

Data validation process 300 may be implemented, for example, over the internet. In such embodiments, data validation process 300 may be implemented as software as a service (SaaS) wherein the set of images 310 may be transmitted 304 to the SaaS for scanning 324 and evaluation 326. Evaluated images 330 may be delivered 308 to an access point for access by an insurance agent. Evaluated images 330 may be delivered 308 with indicators 332, 334, and 336 which indicate whether a particular image was found to be anomalous.

Additional information 336a may accompany an indicator 336. Such additional information may be included for samples regardless as to whether or not a sample was indicated as anomalous. Additional information 336a may include information concerning what in the indicated image 316 appears anomalous. Additional information 336a may contain information including precision (P), recall (R), area under the curve (AUC), information about the sample (X), information about the node (0), information about the evaluated activation, activation distribution (H), other relevant information, or any combination thereof. Indicators 332, 334, and 336 and additional information 336a may collectively be referred to as outputs.

A user (e.g., an insurance agent) may verify the authenticity of the images 312, 314, and 316 by reviewing the set of evaluated images 330 and the indicators 332, 334, and 336. Insurance agents may use additional information 336a provided with indicator 336 to follow up on a claim. Outputs 332, 334, 336, and 336a may be used to aid in decisions as to whether or not to investigate the incident further or approve a claim.

The present disclosure need not be specifically trained to classify data. Still, an end-to-end GAN improvement pipeline may be useful in accordance with the present disclosure. As such, FIG. 4 illustrates system components and dataflow for a GAN improvement system 400, in accordance with embodiments of the present disclosure.

Figure 4:
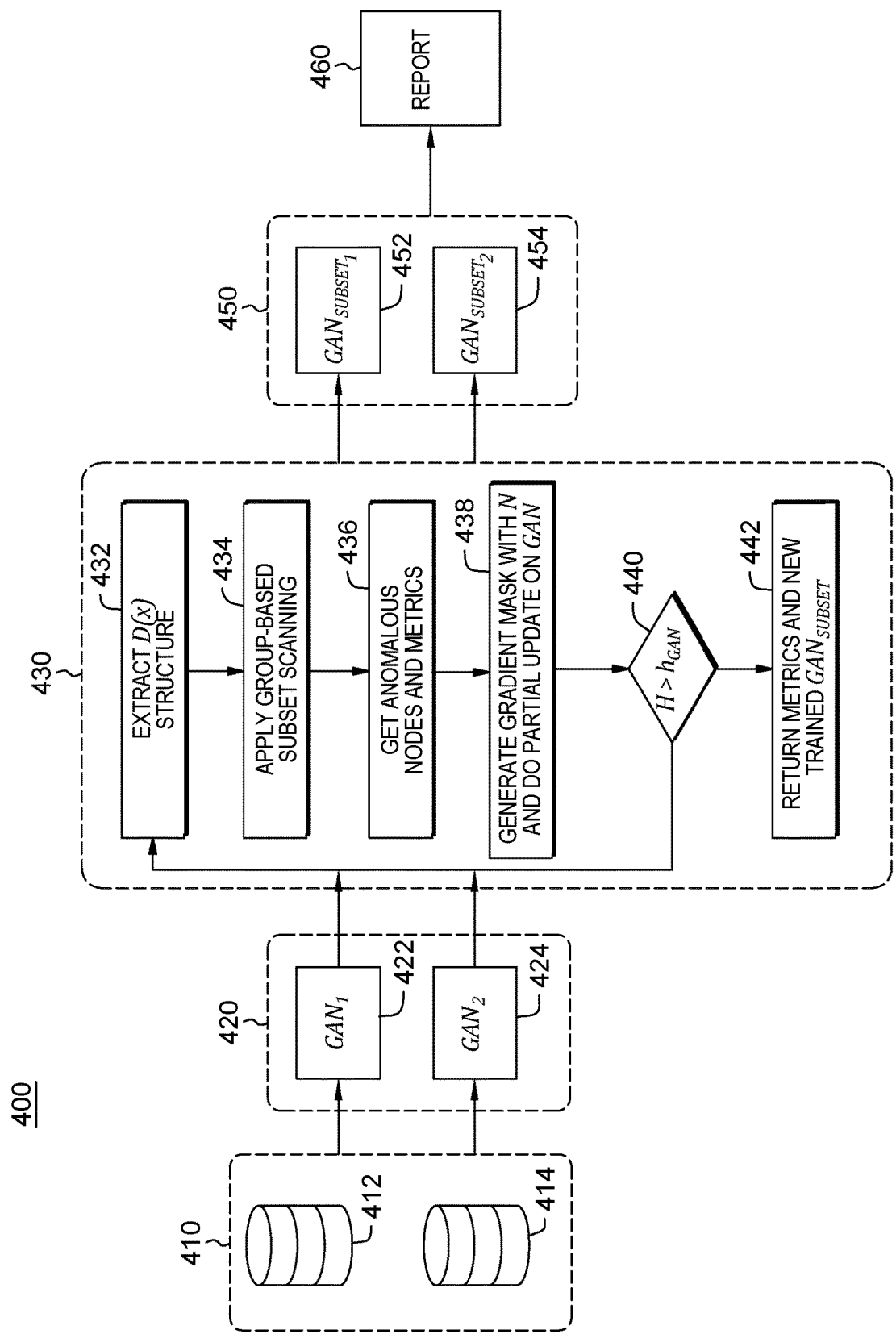
FIG. 4 illustrates system components and dataflow, in accordance with embodiments of the present disclosure.

As shown in FIG. 4, datasets 410 are submitted to one or more GANs 420 to be improved in the pipeline 430. One or more GANs 420 may be submitted to the GAN improvement pipeline 430 for improvement into one or more upgraded GANs 450. One or more of the upgraded one or more GANs 450 may then generate a report 460 which may include data and metrics about the upgrade from GANs 420 to upgraded GANs 450.

One or more datasets 410 are obtained. Datasets 410 may incorporate one or multiple databases 412 and 414. Two databases 412 and 414 are shown; additional databases may be used as desired. Databases 412 and 414 may be of one homogenous data type or multiple data types. One or more data types may be included in a single database 412 or 414. Data types that may be included in databases 412 and 414 may include text, image, audio, video, and other data types. In some embodiments, database 412 may be a text database. In some embodiments, database 414 may be an image database. In some embodiments, database 412 may contain audio and image data types. In some embodiments, database 414 may include text and video data types. In some embodiments, databases 412 and 414 may contain overlapping data types such that both databases include, for example, text data. Any combination of data types, homogenous or mixed, may be included in datasets 410.

A GAN repository 420 may include a single GAN 422 or multiple GANs 422 and 424. GANs 422 and 424 may be off-the-shelf, generic, or specialty made. GANs 422 and 424 may enter the GAN improvement pipeline 430 independently or simultaneously, in batches or all at once. One GAN 422 may be selected to participate in the GAN improvement pipeline 430 whereas another GAN 424 may not be selected to participate.

One or more datasets 410 may be delivered to the one or more GANs 422 and 424 together as one or more batches, to each $GAN_1$ 422 and $GAN_2$ 424 individually, or some combination thereof. One or more datasets may be delivered to the one or more GANs 422 and 424 via a collective submission such as to a GAN receptacle 420. If delivered via collective submission to a GAN repository 420, GAN repository may deliver one or more datasets 410, or any part thereof, to any, all, or none of the GANs 422 and 424 it contains; if delivered via collective submission to a GAN repository, one or more datasets 410 or databases 412 and 414 may be delivered simultaneously to any receiving GANs 422 and 424 or to any receiving GANs 422 and 424 at different times.

One or more GANs 422 and 424 may receive one or more datasets 410 or parts thereof 412 and 414 and enter the GAN improvement pipeline 430. GANs 422 and 424 may enter the GAN improvement pipeline simultaneously or at different times and either run through the pipeline 430 independently or not. GANs 422 and 424 may run the pipeline 430 at the same pace or different paces, may loop the pipeline 430 loop the same number of times or different numbers of times, and may complete the pipeline 430 at the same time or at different times.

In accordance with embodiments of the present disclosure, a GAN improvement pipeline 430 may include extracting activations from a GAN 432, applying group-based subset scanning 434 to the extracted activations, obtaining anomalous samples and nodes 436, generating a gradient mask and partially updating the GAN therewith 438, determining whether additional training of the GAN is desired 440, and, if no additional training of the GAN is desired, returning an improved GAN 442.

The one or more GANs 422 and 424 may be updated in a GAN improvement pipeline 430. In accordance with embodiments of the present invention, GAN improvement pipeline 430 includes extracting discriminator structure 432 from the GAN 422 or 424 of which the discriminator is a part.

Group-based subset scanning is then applied 434. Group-based subset scanning 434 provides anomalous nodes via unsupervised machine learning. The matrix of activations may be converted into a matrix of empirical p-values or p-value ranges corresponding to the proportion of activations from a background set of activations that are larger than activations from an evaluation set or input. The matrix of p-values from the evaluation set may be processed to maximize the scoring function by using a NPSS to identify a subset of evaluation samples with an activation at a subset of nodes; the scoring function may be, for example, Berk-Jones or Higher Criticism. A priority function may be computed to efficiently perform the maximization such that the subset of samples that maximizes the scoring function consist of the top-k highest priority samples. For the optimal subset of samples, the maximization process may be reversed to identify the subsets of nodes. This iterative ascent process 434 continues until convergence.

Anomalous nodes, samples, and metrics are obtained 436 from the converged group-based subset scanning 434. Metrics obtained 436 may include normal distribution (N), precision (P), recall (R), area under the curve (AUC), and other data.

A gradient mask may be generated and a partial update of the GAN completed 438. A gradient mask developed using the normal distribution may efficiently retrain filters containing anomalous nodes. The gradient mask may be used to retrain the model. By retraining the model with a gradient mask based on the normal distribution, the system 400 may perform partial updates to the GAN using detected anomalous nodes. A partial update to the GAN may specifically benefit the generator such that the generator receives feedback with respect to which generated samples were recognized as anomalous and how to better generate artificial samples. A partial update to the GAN may instead benefit the discriminator such that the discriminator receives feedback with respect to which samples were improperly categorized and how to better classify samples.

In some embodiments, the present disclosure includes generating masks that determine which nodes will be trained or further trained. For each layer in a discriminator, the output shape of each output layer is extracted, the shape of each output layer is used to generate an empty tensor, and indexes of anomalous nodes are extracted to generate a binary mask for each output layer on the discriminator. Once the masks are generated, the training setting of the GAN may be updated such that both the discriminator layers and the loss function are updated. If using a mask in binary tensors, the forward and backward pass of the GAN are modified by multiplying the output by the mask such that further training will retrain anomalous nodes but will not retrain non-anomalous nodes. The subset score is added as a term to the loss function. The training score is minimized.

Operations 440, 432, 434, 436, and 438 form a loop within the pipeline 430. If the Hellinger distance (H) is greater than the probability distribution ($h_{GAN}$) from the GAN in the pipeline, the loop is repeated 440. Specifically, if H is greater than $h_{GAN}$, the discriminator structure is extracted 432 and the process continues. Once the probability distribution meets the threshold 440, the process exits the loop in the pipeline 430 to return metrics and the trained/re-trained GAN 442. A GAN that has been trained/re-trained GAN via the GAN improvement pipeline may be referred to as $GAN_{SUBSET}$ or SubsetGAN.

Different thresholds may be used as desired; for example, the threshold that determines whether the process loops 440 could be an accuracy, precision, and/or recall threshold. Thresholds may differ by the GAN in the GAN improvement system 400, the target or objective of the relevant GAN, or other factors.

One or more updated GANs 450 are output by the GAN improvement pipeline 430. Updated GANs 450 may include one or more GANs 452 and 454. One or more updated GANs 452 and 454 may then be used to generate a report 460. The generated report 460 may include data and metrics about the upgrade from GANs 420 to upgraded GANs 450, information about anomalous and non-anomalous nodes, samples, subset scanning metrics, normal distribution, precision, recall, area under the curve, other data and metrics, and newly trained GAN models.

The GAN improvement system 400 is capable of handling various sources and various proportions of natural and artificial content. Table 1 shows precision, recall, and detection power for group-based and individual subset scanning and other models.

TABLE 1

| Type of Generation | GAN Type | Subset (Indv.) AUC | Subset (Group) | | | FakeSpotter | | | AutoGAN | | |
| --- | --- | --- | --- | --- | --- | --- | --- | --- | --- | --- | --- |
| | | | P | R | AUC | P | R | AUC | P | R | AUC |
| Total synthesis | PGGAN | 0.950 | 0.941 | 0.900 | 0.999 | 0.986 | 0.987 | 0.985 | 0.926 | 0.974 | 0.948 |
| Attribute Editing | StarGAN | 0.999 | 0.998 | 0.999 | 1.0 | 0.901 | 0.865 | 0.881 | 0.690 | 0.567 | 0.656 |

Table 2 shows precision and recall metrics for an example of group subset scanning over three convolutional layers of a discriminator using a GAN improvement pipeline 430 in accordance with the present disclosure. The percentages at the top of the columns refers to the proportion of artificial content.

TABLE 2

| layers/prop. | metric | 50% | 40% | 30% | 20% | 10% |
| --- | --- | --- | --- | --- | --- | --- |
| scaleLayers.0.0 | Precision | 0.929 ± 0.035 | 0.895 ± 0.052 | 0.832 ± 0.076 | 0.719 ± 0.125 | 0.405 ± 0.153 |
| | recall | 0.855 ± 0.051 | 0.851 ± 0.058 | 0.867 ± 0.072 | 0.875 ± 0.071 | 0.886 ± 0.105 |
| scaleLayers.1.0 | Precision | 0.941 ± 0.034 | 0.909 ± 0.046 | 0.859 ± 0.066 | 0.759 ± 0.110 | 0.483 ± 0.162 |
| | recall | 0.900 ± 0.045 | 0.900 ± 0.052 | 0.904 ± 0.053 | 0.912 ± 0.063 | 0.938 ± 0.071 |
| scaleLayers1.1 | Precision | 0.942 ± 0.036 | 0.899 ± 0.045 | 0.841 ± 0.072 | 0.727 ± 0.105 | 0.416 ± 0.148 |
| | recall | 0.885 ± 0.046 | 0.891 ± 0.048 | 0.891 ± 0.058 | 0.891 ± 0.058 | 0.899 ± 0.068 |
| groupScaleZero.0 | Precision | 0.942 ± 0.037 | 0.907 ± 0.051 | 0.853 ± 0.071 | 0.752 ± 0.108 | 0.482 ± 0.108 |
| | recall | 0.828 ± 0.054 | 0.837 ± 0.059 | 0.840 ± 0.072 | 0.857 ± 0.081 | 0.871 ± 0.121 |
| groupScaleZero.1 | Precision | 0.942 ± 0.035 | 0.917 ± 0.048 | 0.868 ± 0.066 | 0.777 ± 0.104 | 0.474 ± 0.162 |
| | recall | 0.832 ± 0.055 | 0.836 ± 0.065 | 0.843 ± 0.062 | 0.845 ± 0.079 | 0.875 ± 0.111 |
| decisionLayer | Precision | 0.326 ± 0.065 | 0.245 ± 0.065 | 0.171 ± 0.061 | 0.110 ± 0.045 | 0.048 ± 0.033 |
| | recall | 0.218 ± 0.072 | 0.213 ± 0.082 | 0.209 ± 0.089 | 0.205 ± 0.093 | 0.196 ± 0.142 |

Table 3 shows the adaptability of the system of the present disclosure to different scoring functions as well as varying artificial data and generator settings. The percentages at the top of the columns refers to the proportion of artificial content.

TABLE 3

| | Group-based and Individual Subset scanning | | | | | | | | | | | | | |
|---|---|---|---|---|---|---|---|---|---|---|---|---|---|---|
| | Scoring Function BJ | | | | | | | Scoring Function Higher Criticism | | | | | | |
| | 50% | | | 30% | | | Indv. | 50% | | | 30% | | | Indv. |
| Layers | P | R | AUC | P | R | AUC | AUC | P | R | AUC | P | R | AUC | AUC |
| Conv2d_1 | 1.0 | 1.0 | 1.0 | 1.0 | 1.0 | 1.0 | 1.0 | 1.0 | 1.0 | 1.0 | 1.0 | 1.0 | 1.0 | 1.0 |
| LeakyReLU_1 | 1.0 | 1.0 | 1.0 | 1.0 | 1.0 | 1.0 | 1.0 | 1.0 | 1.0 | 1.0 | 1.0 | 1.0 | 1.0 | 1.0 |
| Conv2d_2 | 0.879 | 1.0 | 1.0 | 0.565 | 0.979 | 0.781 | 0.956 | 0.997 | 0.942 | 1.0 | 0.693 | 0.926 | 0.758 | 0.661 |
| BatchNorm2d_1 | 0.938 | 1.0 | 1.0 | 0.580 | 0.980 | 0.803 | 0.956 | 0.999 | 0.943 | 1.0 | 0.683 | 0.916 | 0.778 | 0.661 |
| LeakyRELU_2 | 0.932 | 0.999 | 1.0 | 0.577 | 0.977 | 0.795 | 0.956 | 0.998 | 0.937 | 1.0 | 0.711 | 0.945 | 0.781 | 0.661 |
| Conv2d_3 | 0.496 | 0.322 | 0.378 | 0.284 | 0.336 | 0.383 | 0.528 | 0.547 | 0.227 | 0.487 | 0.340 | 0.221 | 0.531 | 0.523 |
| BatchNorm2d_2 | 0.493 | 0.308 | 0.408 | 0.288 | 0.331 | 0.414 | 0.528 | 0.541 | 0.209 | 0.545 | 0.328 | 0.208 | 0.508 | 0.523 |
| LeakyRELU_3 | 0.503 | 0.331 | 0.380 | 0.273 | 0.326 | 0.425 | 0.528 | 0.560 | 0.217 | 0.503 | 0.354 | 0.236 | 0.455 | 0.523 |
| Con2d_4 | 0.340 | 0.211 | 0.062 | 0.164 | 0.180 | 0.191 | 0.380 | 0.219 | 0.02 | 0.284 | 0.123 | 0.02 | 0.422 | 0.380 |
| Sigmoid | 0.327 | 0.197 | 0.059 | 0.176 | 0.191 | 0.185 | 0.380 | 0.263 | 0.03 | 0.298 | 0.120 | 0.02 | 0.373 | 0.380 |

The GAN improvement system 400 enables better training of GANs. Specifically, upgraded GANs 452 and 454 may have more robust discriminators such that the GANs 452 and 454 are better able to classify data. Additionally, upgraded GANs 452 and 454 may have more robust generators such that the GANs 452 and 454 are better able to generate data such that it is more likely to be classified as natural. The retraining process and customized loss functions serve to improve GANs that make use of the GAN improvement system 400.

Some metrics are more intuitive when illustrated via graph. FIG. 5 shows the distribution of subset scores for image samples over convolutional layers over the discriminator of a GAN.

Figure 5A:
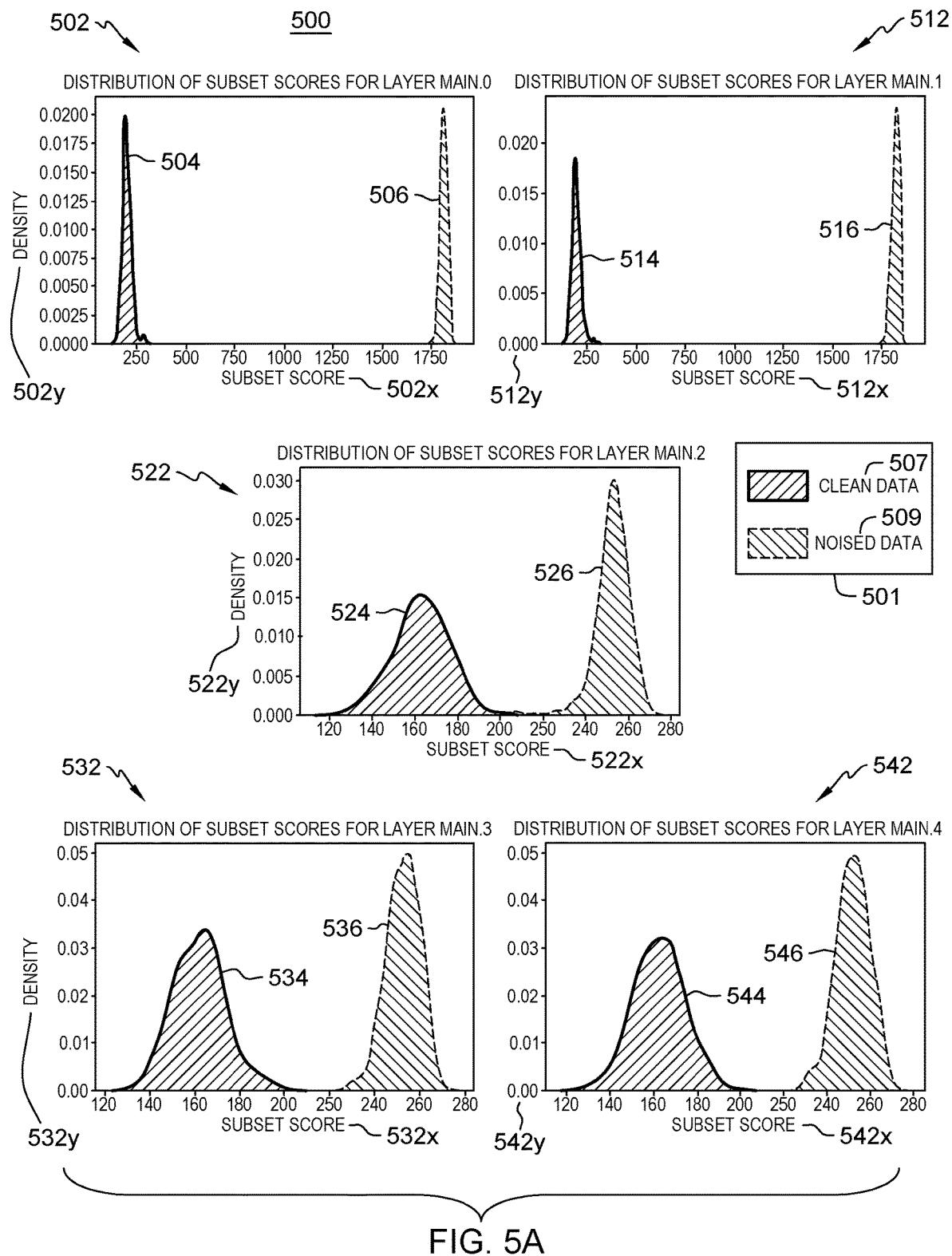
FIG. 5A depicts distributions of subset scores, in accordance with embodiments of the present disclosure.
Figure 5B:
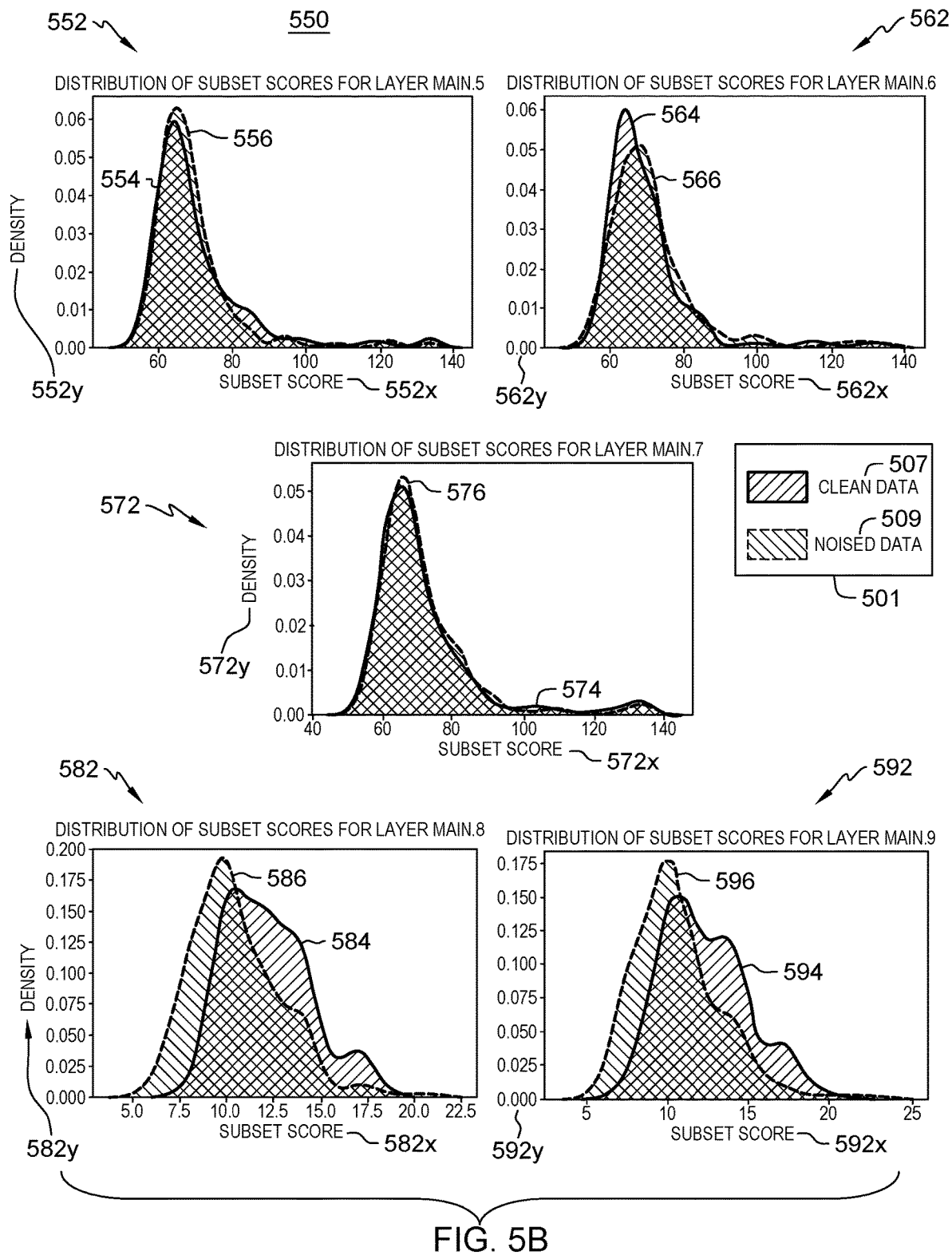
FIG. 5B illustrates distributions of subset scores, in accordance with embodiments of the present disclosure.

FIG. 5 is split into FIG. 5A and FIG. 5B for clarity of images. FIG. 5 displays graphs of distributions of subset scores with both clean 507 and noised 509 data as indicated in the legend 501, which may also be referred to as a key 501, graph legend 501, or graph key 501. Clean data 507 may be referred to as natural or authentic data; noised data 509 may be referred to as artificial or anomalous data.

Generally, subsets containing noised data 509 obtain higher scores than sets containing only clean data. A higher proportion of noised samples should result in higher scores.

Each of the graphs 502, 512, 522, 532, 542, 552, 562, 572, 582, and 592 are distributions of subset scores for different layers. The graphs each contain a set of clean data 504, 514, 524, 534, 544, 554, 564, 574, 584, and 594 and a set of noised data 506, 516, 526, 536, 546, 556, 566, 576, 586, and 596. Density is tracked on each y-axis 502y, 512y, 522y, 532y, 542y, 552y, 562y, 572y, 582y, and 592y and subset score is tracked on each x-axis 502x, 512x, 522x, 532x, 542x, 552x, 562x, 572x, 582x, and 592x.

As higher layers are evaluated, subset scores decrease. The decrease is most notable in comparing the scales of the various x-axes 502x, 512x, 522x, 532x, 542x, 552x, 562x, 572x, 582x, and 592x. For example, in FIG. 5A, the x-axis range for main layer 0 tracked on graph 502 is 0-2000 whereas the range for main layer 4 tracked on graph 542 is 0-300. The range continues to decrease through FIG. 5B: the subset score ranges from 1-150 for main layer 5 tracked on graph 552 and decreases to a 0-25 range for main layer 9 as shown on graph 592.

Figure 6:
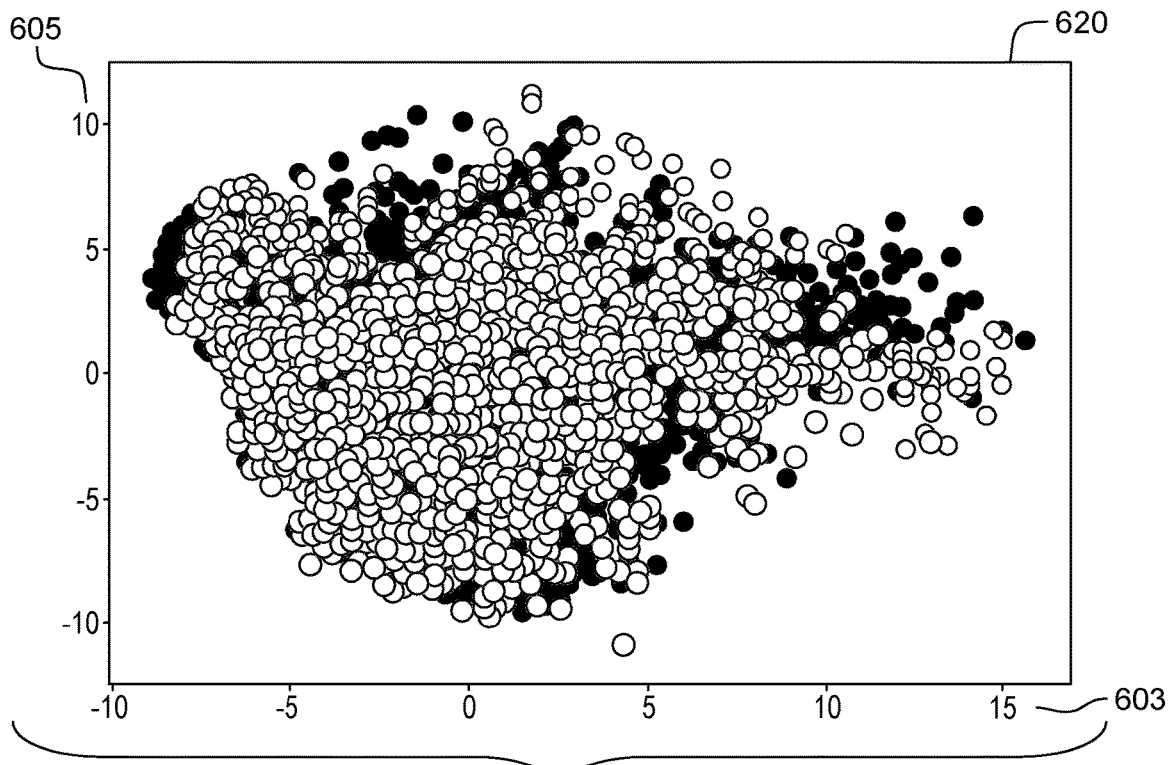
FIG. 6 depicts qualitative inspection of content, in accordance with embodiments of the present disclosure.

FIG. 6 depicts a qualitative inspection of content in accordance with embodiments of the present disclosure. Samples of the Modified National Institute of Standards and Technology, also referred to as MNIST, dataset 610 are graphed 620. The MNIST database consists of handwritten digits, such as numbers, and is commonly used for training image processing systems. Graph 620 is the output of an embodiment of the present disclosure. Graph 620 includes legend 601 identifying which points on the graph 620 are natural data 607 and which points on the graph are natural data 609. The samples are plotted against an x-axis 603 and a y-axis 605.

Figure 7A:
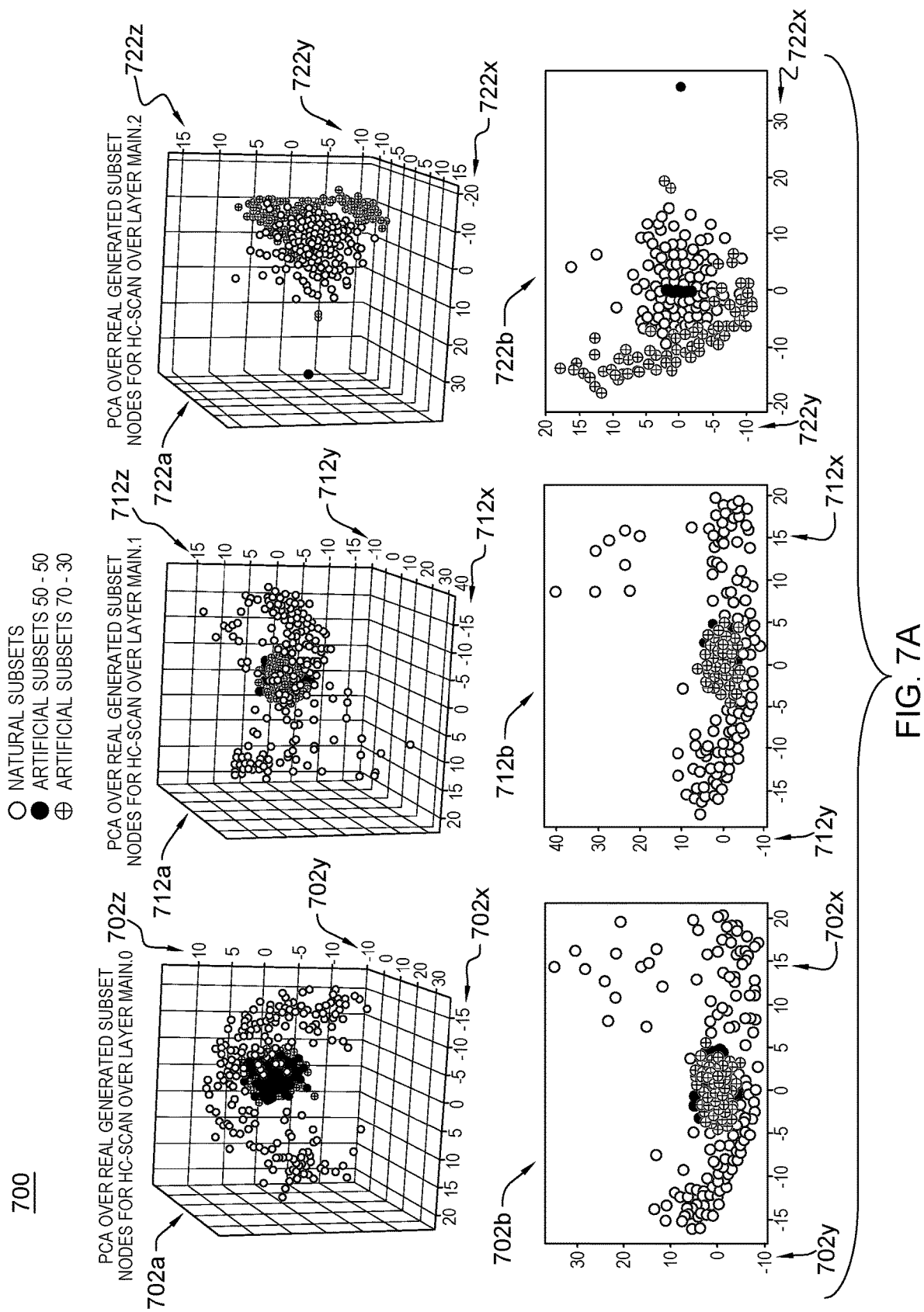
FIG. 7A illustrates higher criticism statistic group scan nodes projected in two dimensions and three dimensions, in accordance with embodiments of the present disclosure.
Figure 7B:
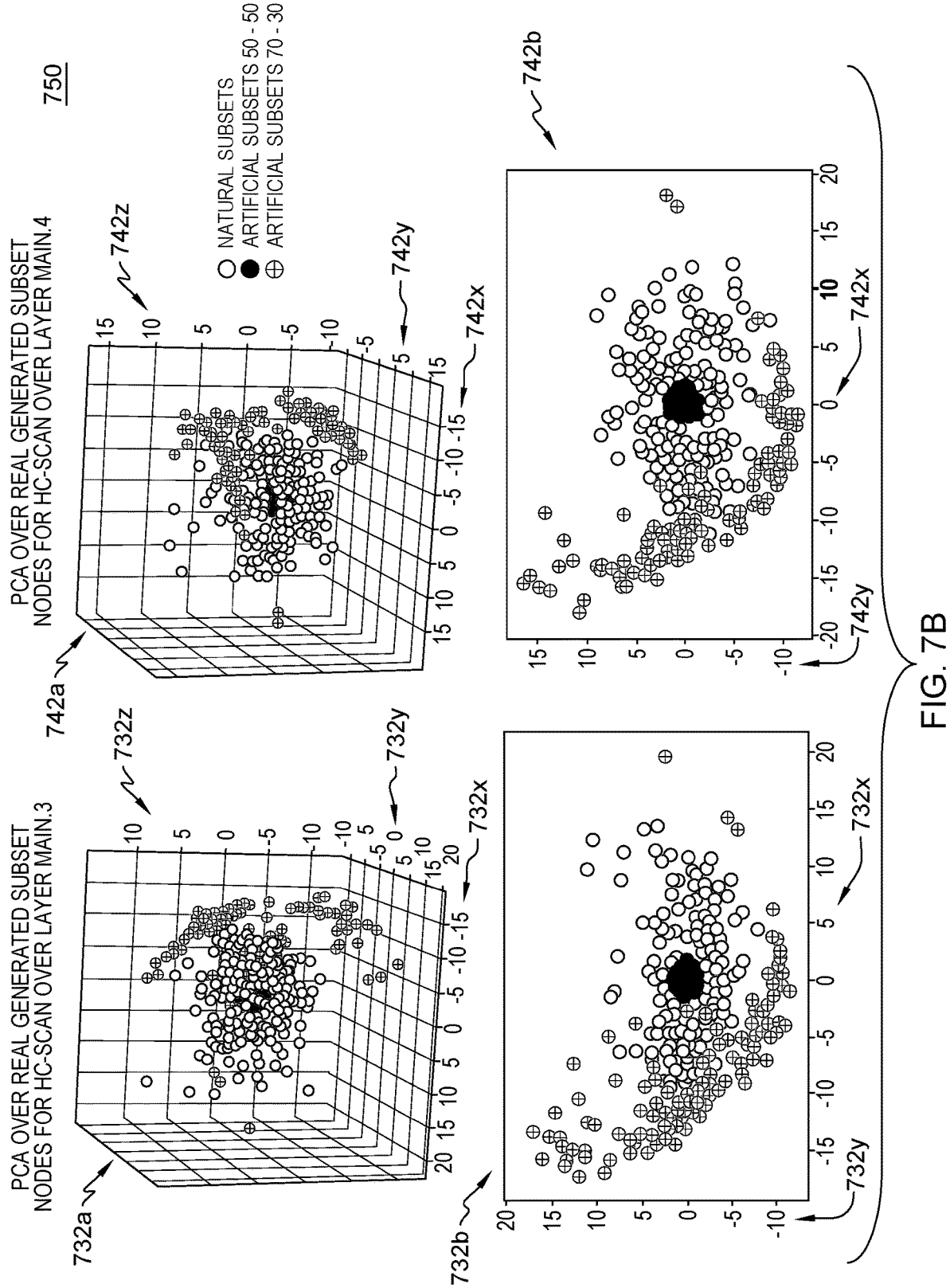
FIG. 7B depicts higher criticism statistic group scan nodes projected in two dimensions and three dimensions, in accordance with embodiments of the present disclosure.

FIG. 7 is split into FIG. 7A and FIG. 7B for clarity of images. FIG. 7 includes graphs of Principal Component Analysis (PCA) over generated subset nodes for Higher Criticism (HC) scans projected in two dimensions and three dimensions. FIG. 7 also includes a legend, which may also be referred to as a key, graph legend, or graph key.

The graphs are rendered in pairs such that each two-dimensional graph has a three-dimensional graph counterpart. For example, graph 702b is the two-dimensional rendering of the data in three-dimensional graph 702a for the main 0 layer. Likewise, 712a and 712b are paired renderings of the main 1 layer, 722a and 722b are paired renderings of the main 2 layer, 732a and 732b are paired renderings of the main 3 layer, and 742a and 742b are paired renderings of the main 4 layer.

Each of the graphs 702a, 702b, 712a, 712b, 722a, 722b, 732a, 732b, 742a, and 742b include natural subsets, a mix of artificial subsets mixed 50-50 with natural subsets, and a mix of artificial subsets mixed 70-30 with natural subsets. Each of the graphs 702a, 702b, 712a, 712b, 722a, 722b, 732a, 732b, 742a, and 742b include an x-axis 702x, 712x, 722x, 732x, and 742x and a y-axis 702y, 712y, 722y, 732y, and 742y. Each of the three-dimensional graphs 702a, 712a, 722a, 732a, and 742a have an additional z-axis 702z, 712z, 722z, 732z, and 742z.

Figure 8:
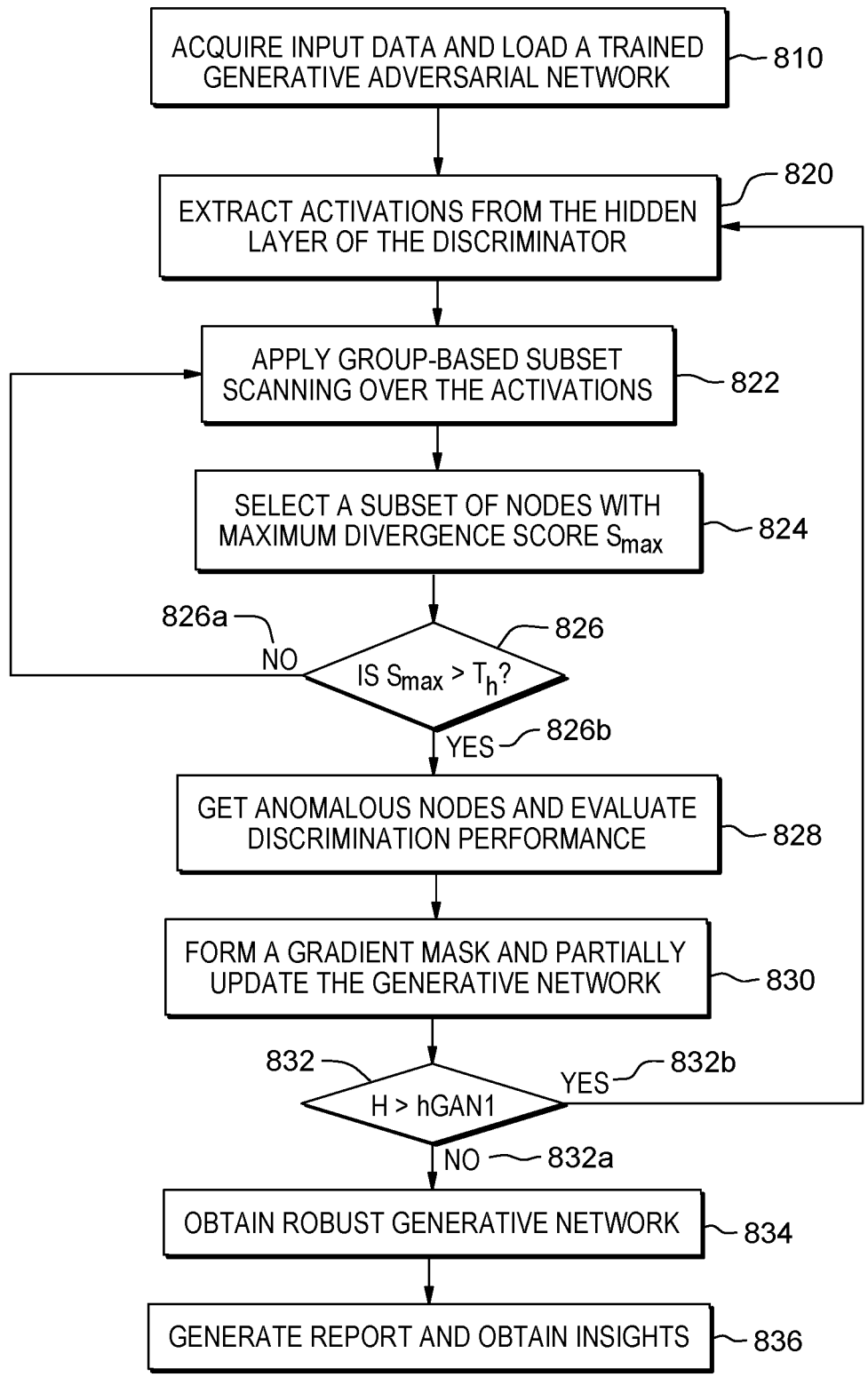
FIG. 8 illustrates a GAN improvement method, in accordance with embodiments of the present disclosure.

FIG. 8 illustrates a GAN improvement method 800, in accordance with embodiments of the present disclosure. GAN improvement method 800 may occur, for example, in a system such as GAN improvement system 400. GAN improvement method 800 may, for example, replace GAN improvement pipeline 430 of GAN improvement system 400. GAN improvement method 800 may operate independently from a discrete GAN improvement system.

As shown in FIG. 8, input data and a trained GAN are acquired and loaded 810. Data 410 may include one or more databases which may be of one homogenous data type or multiple data types. One or more data types, such as text, image, audio, video, and other data types, may be included in a single database. In some embodiments, multiple databases containing overlapping data types may be used. Any combination of data types, homogenous or mixed, may be included in datasets.

Activations are extracted 820 from a layer of the discriminator; activations may be extracted 820 from a hidden layer of the discriminator. Extracting activations 820 from the discriminator may reveal the structure of the discriminator or may result in the extraction of the discriminator structure. Alternatively or coextensively, extracting activations 820 may reveal information about the discriminator.

Group-based subset scanning is applied 822 over the activations. Group-based subset scanning 822 may provide anomalous nodes via unsupervised machine learning. The matrix of activations may be converted into a matrix of empirical p-values or p-value ranges corresponding to the proportion of activations from a background set of activations that are larger than activations from an evaluation set or input. The matrix of p-values from the evaluation set may be processed to maximize the scoring function by using a NPSS to identify a subset of evaluation samples with an activation at a subset of nodes; the scoring function may be, for example, Berk-Jones or Higher Criticism. A priority function may be computed to efficiently perform the maximization such that the subset of samples that maximizes the scoring function consist of the top-k highest priority samples. For the optimal subset of samples, the maximization process may be reversed to identify the subsets of nodes. Group-based subset scanning is an iterative ascent process 822 that may continue until convergence.

A subset of nodes with maximum divergence score $S_{MAX}$ may be selected 824 and compared 826 to the arithmetic mean output of the GAN $T_h$. If the maximum divergence score $S_{MAX}$ is not greater (e.g., is less) than the arithmetic mean output of the GAN $T_h$ 826a, then the GAN may be redirected to again apply group-based subset scanning over the activations 822 with different parameter settings to improve the GAN improvement method 800. Further, in some embodiments, if the maximum divergence score $S_{MAX}$ is not greater than the arithmetic mean output of the GAN $T_h$ 826a, various interventions may occur. The GAN may be entirely removed from the improvement method 800, looped back in the method 800 to the extraction of activations from the discriminator 820 to repeat operations 820, 822, and 824 until the threshold 826 is reached, retrained, set aside for independent evaluation, or some combination thereof. Not meeting the threshold could result in a notification being sent to a user for a user to investigate and decide on a course of action.

If the maximum divergence score $S_{MAX}$ is greater than the arithmetic mean output of the GAN $T_h$ 826b, then anomalous nodes may be obtained and the discriminator performance is evaluated 828. Anomalous nodes, samples, and metrics may be obtained 828 from the converged group-based subset scanning 822. Metrics obtained 828 may include normal distribution (N), precision (P), recall (R), area under the curve (AUC), and other data.

A gradient mask may be formed and the GAN partially updated 830 with the gradient mask. A gradient mask developed using the normal distribution may efficiently retrain filters containing anomalous nodes. A gradient mask may be used to retrain the model. By retraining the model with a gradient mask based on the normal distribution, the GAN may be partially updated using detected anomalous nodes. A partial update to the GAN may specifically benefit the generator such that the generator receives feedback with respect to which generated samples were recognized as anomalous and how to better generate artificial samples. A partial update to the GAN may instead benefit the discriminator such that the discriminator receives feedback with respect to which samples were improperly categorized and how to better classify samples.

The Hellinger distance (H) is compared 832 to the GAN results probability distribution ($h_{GAN}$) to determine whether additional training of the GAN is desired. Various operations 820, 822, 824, 826, 828, 830, and 832 form a loop within the GAN improvement method 800. If the Hellinger distance (H) is greater than the probability distribution ($h_{GAN}$) from the GAN in the pipeline, the loop is repeated 832b. Once the probability distribution meets the threshold 832, the process exits the loop 832a to return metrics and the trained/retrained GAN 834. A GAN that has been trained/re-trained GAN via the method 800 may be referred to as $GAN_{SUBSET}$ or SubsetGAN.

Different thresholds may be used as desired; for example, the determinative threshold for whether the process loops 832b could be an accuracy, precision, and/or recall threshold. Thresholds may differ by the GAN in the GAN improvement method 800, the target objective of the relevant GAN, or other factors.

An updated GAN may be obtained 834 from the GAN improvement method 800. The GANs may then be used to generate a report and obtain insights 836. The generated report 836 may include data and metrics about the upgrade to the GAN, information about anomalous and non-anomalous nodes, samples, subset scanning metrics, normal distribution, precision, recall, area under the curve, other data and metrics, and newly trained GAN models.

A GAN, GAN improvement method, GAN improvement system, or other GAN implementation may be implemented on a local computer, on a remote computer, on the cloud, or may use any suitable combination thereof.

An aspect of the disclosure is evaluating data while using the internet. Some embodiments of the disclosure train or retrain a GAN using information from external sources. Some embodiments of the disclosure evaluate data in real time.

Figure 9:
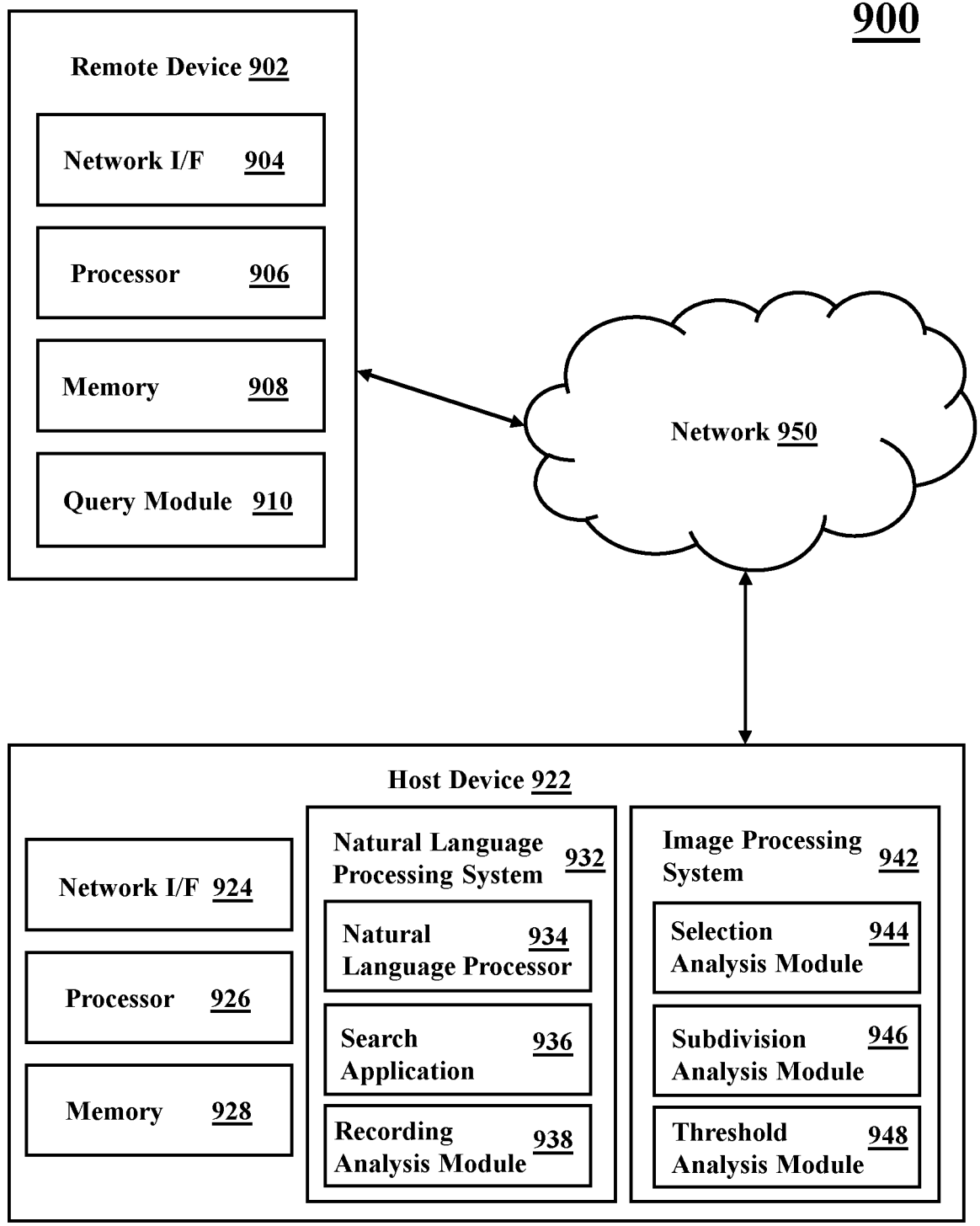
FIG. 9 illustrates a block diagram of an example computing environment in which illustrative embodiments of the present disclosure may be implemented.

Some embodiments of the present disclosure may utilize a natural language parsing and/or subparsing component. Thus, aspects of the disclosure may relate to natural language processing. Accordingly, an understanding of the embodiments of the present invention may be aided by describing embodiments of natural language processing systems and the environments in which these systems may operate. Turning now to FIG. 9, illustrated is a block diagram of an example computing environment 900 in which illustrative embodiments of the present disclosure may be implemented. In some embodiments, the computing environment 900 may include a remote device 902 and a host device 922.

Consistent with various embodiments of the present disclosure, the host device 922 and the remote device 902 may be computer systems. The remote device 902 and the host device 922 may include one or more processors 906 and 926 and one or more memories 908 and 928, respectively. The remote device 902 and the host device 922 may be configured to communicate with each other through an internal or external network interface 904 and 924. The network interfaces 904 and 924 may be modems or network interface cards. The remote device 902 and/or the host device 922 may be equipped with a display such as a monitor. Additionally, the remote device 902 and/or the host device 922 may include optional input devices (e.g., a keyboard, mouse, scanner, or other input device) and/or any commercially available or custom software (e.g., browser software, communications software, server software, natural language processing software, search engine and/or web crawling software, filter modules for filtering content based upon predefined parameters, etc.). In some embodiments, the remote device 902 and/or the host device 922 may be servers, desktops, laptops, or hand-held devices.

The remote device 902 and the host device 922 may be distant from each other and communicate over a network 950. In some embodiments, the host device 922 may be a central hub from which remote device 902 can establish a communication connection, such as in a client-server networking model. Alternatively, the host device 922 and remote device 902 may be configured in any other suitable networking relationship (e.g., in a peer-to-peer configuration or using any other network topology).

In some embodiments, the network 950 can be implemented using any number of any suitable communications media. For example, the network 950 may be a wide area network (WAN), a local area network (LAN), an internet, or an intranet. In certain embodiments, the remote device 902 and the host device 922 may be local to each other and communicate via any appropriate local communication medium. For example, the remote device 902 and the host device 922 may communicate using a local area network (LAN), one or more hardwire connections, a wireless link or router, or an intranet. In some embodiments, the remote device 902 and the host device 922 may be communicatively coupled using a combination of one or more networks and/or one or more local connections. For example, the remote device 902 may be hardwired to the host device 922 (e.g., connected with an Ethernet cable) or the remote device 902 may communicate with the host device using the network 950 (e.g., over the Internet).

In some embodiments, the network 950 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 950.

In some embodiments, the remote device 902 may enable a user to input (or may input automatically with or without a user) a query (e.g., is any part of a recording artificial, etc.) to the host device 922 in order to identify subdivisions of a recording that include a particular subject. For example, the remote device 902 may include a query module 910 and a user interface (UI). The query module 910 may be in the form of a web browser or any other suitable software module, and the UI may be any type of interface (e.g., command line prompts, menu screens, graphical user interfaces). The UI may allow a user to interact with the remote device 902 to input, using the query module 910, a query to the host device 922, which may receive the query.

In some embodiments, the host device 922 may include a natural language processing system 932. The natural language processing system 932 may include a natural language processor 934, a search application 936, and a recording module 938. The natural language processor 934 may include numerous subcomponents, such as a tokenizer, a part-of-speech (POS) tagger, a semantic relationship identifier, and a syntactic relationship identifier. An example natural language processor is discussed in more detail in reference to FIG. 6.

The search application 936 may be implemented using a conventional or other search engine and may be distributed across multiple computer systems. The search application 936 may be configured to search one or more databases (e.g., repositories) or other computer systems for content that is related to a query submitted by the remote device 902. For example, the search application 936 may be configured to search dictionaries, papers, and/or archived reports to help identify a particular subject related to a query provided for a class. The recording analysis module 938 may be configured to analyze a recording to identify a particular subject (e.g., of the query). The recording analysis module 938 may include one or more modules or units, and may utilize the search application 936, to perform its functions (e.g., to identify a particular subject in a recording), as discussed in more detail in reference to FIG. 9.

In some embodiments, the host device 922 may include an image processing system 942. The image processing system 942 may be configured to analyze images associated with a recording to create an image analysis. The image processing system 942 may utilize one or more models, modules, or units to perform its functions (e.g., to analyze the images associated with the recording and generate an image analysis). For example, the image processing system 942 may include one or more image processing models that are configured to identify specific images related to a recording. The image processing models may include a section analysis module 944 to analyze single images associated with the recording and to identify the location of one or more features of the single images. As another example, the image processing system 942 may include a subdivision module 946 to group multiple images together identified to have a common feature of the one or more features. In some embodiments, image processing modules may be implemented as software modules. For example, the image processing system 942 may include a section analysis module and a subdivision analysis module. In some embodiments, a single software module may be configured to analyze the image(s) using image processing models.

In some embodiments, the image processing system 942 may include a threshold analysis module 948. The threshold analysis module 948 may be configured to compare the instances of a particular subject identified in a subdivision of sections of the recording against a threshold number of instances. The threshold analysis module 948 may then determine if the subdivision should be displayed to a user.

In some embodiments, the host device may have an optical character recognition (OCR) module. The OCR module may be configured to receive a recording sent from the remote device 902 and perform optical character recognition (or a related process) on the recording to convert it into machine-encoded text so that the natural language processing system 932 may perform NLP on the report. For example, a remote device 902 may transmit a video of a medical procedure to the host device 922. The OCR module may convert the video into machine-encoded text and then the converted video may be sent to the natural language processing system 932 for analysis. In some embodiments, the OCR module may be a subcomponent of the natural language processing system 932. In other embodiments, the OCR module may be a standalone module within the host device 922. In still other embodiments, the OCR module may be located on the remote device 902 and may perform OCR on the recording before the recording is sent to the host device 922.

While FIG. 9 illustrates a computing environment 900 with a single host device 922 and a remote device 902, suitable computing environments for implementing embodiments of this disclosure may include any number of remote devices and host devices. The various models, modules, systems, and components illustrated in FIG. 9 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS to generate an image analysis.

It is noted that FIG. 9 is intended to depict the representative major components of an exemplary computing environment 900. In some embodiments, however, individual components may have greater or lesser complexity than as represented in FIG. 9, components other than or in addition to those shown in FIG. 9 may be present, and the number, type, and configuration of such components may vary.

Figure 10:
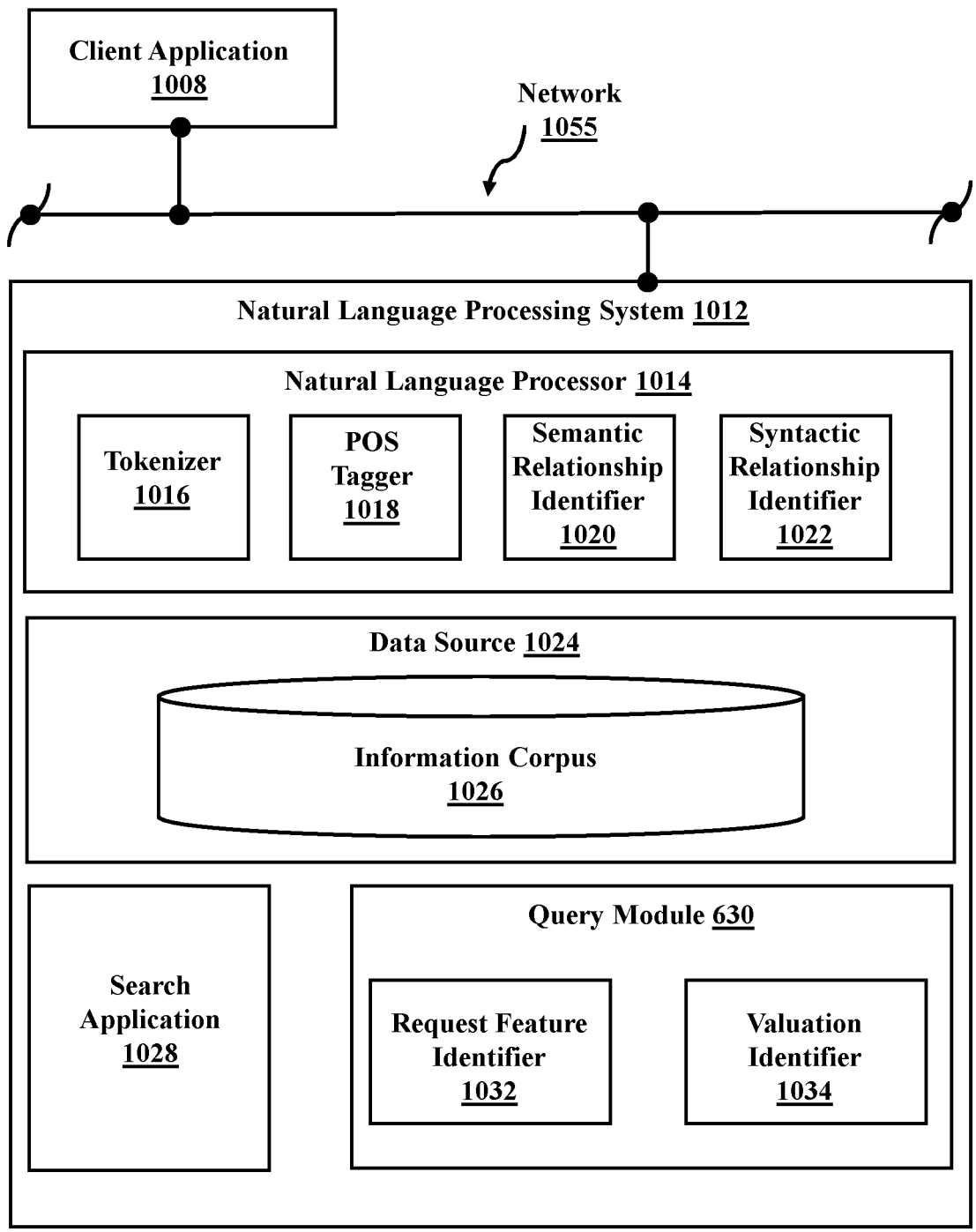
FIG. 10 depicts a block diagram of an example natural language processing system configured to analyze a recording to identify a particular subject of a query, in accordance with embodiments of the present disclosure.

Referring now to FIG. 10, shown is a block diagram of an exemplary system architecture 1000 including a natural language processing system 1012 configured to analyze data to identify objects of interest (e.g., possible anomalies, natural data, etc.), in accordance with embodiments of the present disclosure. In some embodiments, a remote device (such as remote device 902 of FIG. 9) may submit a text segment and/or a corpus to be analyzed to the natural language processing system 1012 which may be housed on a host device (such as host device 922 of FIG. 9). Such a remote device may include a client application 1008, which may itself involve one or more entities operable to generate or modify information associated with the recording and/or query that is then dispatched to a natural language processing system 1012 via a network 1055.

Consistent with various embodiments of the present disclosure, the natural language processing system 1012 may respond to text segment and corpus submissions sent by a client application 1008. Specifically, the natural language processing system 1012 may analyze a received text segment and/or corpus (e.g., video, news article, etc.) to identify an object of interest. In some embodiments, the natural language processing system 1012 may include a natural language processor 1014, data sources 1024, a search application 1028, and a query module 1030. The natural language processor 1014 may be a computer module that analyzes the recording and the query. The natural language processor 1014 may perform various methods and techniques for analyzing recordings and/or queries (e.g., syntactic analysis, semantic analysis, etc.). The natural language processor 1014 may be configured to recognize and analyze any number of natural languages. In some embodiments, the natural language processor 1014 may group one or more sections of a text into one or more subdivisions. Further, the natural language processor 1014 may include various modules to perform analyses of text or other forms of data (e.g., recordings, etc.). These modules may include, but are not limited to, a tokenizer 1016, a part-of-speech (POS) tagger 1018 (e.g., which may tag each of the one or more sections of text in which the particular object of interest is identified), a semantic relationship identifier 1020, and a syntactic relationship identifier 1022.

In some embodiments, the tokenizer 1016 may be a computer module that performs lexical analysis. The tokenizer 1016 may convert a sequence of characters (e.g., images, sounds, etc.) into a sequence of tokens. A token may be a string of characters included in a recording and categorized as a meaningful symbol. Further, in some embodiments, the tokenizer 1016 may identify word boundaries in a body of text and break any text within the body of text into their component text elements, such as words, multiword tokens, numbers, and punctuation marks. In some embodiments, the tokenizer 1016 may receive a string of characters, identify the lexemes in the string, and categorize them into tokens.

Consistent with various embodiments, the POS tagger 1018 may be a computer module that marks up a word in a recording to correspond to a particular part of speech. The POS tagger 1018 may read a passage or other text in natural language and assign a part of speech to each word or other token. The POS tagger 1018 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed body of texts and/or corpora (e.g., the content of one text segment may shed light on the meaning of one or more objects of interest in another text segment). Examples of parts of speech that may be assigned to words include, but are not limited to, nouns, verbs, adjectives, adverbs, and the like. Examples of other part of speech categories that POS tagger 1018 may assign include, but are not limited to, comparative or superlative adverbs, wh-adverbs, conjunctions, determiners, negative particles, possessive markers, prepositions, wh-pronouns, and the like. In some embodiments, the POS tagger 1018 may tag or otherwise annotate tokens of a recording with part of speech categories. In some embodiments, the POS tagger 1018 may tag tokens or words of a recording to be parsed by the natural language processing system 1012.

In some embodiments, the semantic relationship identifier 1020 may be a computer module that may be configured to identify semantic relationships of recognized subjects (e.g., words, phrases, images, etc.) in a body of text/corpus. In some embodiments, the semantic relationship identifier 1020 may determine functional dependencies between entities and other semantic relationships.

Consistent with various embodiments, the syntactic relationship identifier 1022 may be a computer module that may be configured to identify syntactic relationships in a body of text/corpus composed of tokens. The syntactic relationship identifier 1022 may determine the grammatical structure of sentences such as, for example, which groups of words are associated as phrases and which word is the subject or object of a verb. The syntactic relationship identifier 1022 may conform to formal grammar.

In some embodiments, the natural language processor 1014 may be a computer module that may group sections of a recording into subdivisions and generate corresponding data structures for one or more subdivisions of the recording. For example, in response to receiving a text segment at the natural language processing system 1012, the natural language processor 1014 may output subdivisions of the text segment as data structures. In some embodiments, a subdivision may be represented in the form of a graph structure. To generate the subdivision, the natural language processor 1014 may trigger computer modules 1016-1022.

In some embodiments, the output of natural language processor 1014 may be used by search application 1028 to perform a search of a set of (i.e., one or more) corpora to retrieve one or more subdivisions including a particular subject associated with a query (e.g., in regard to an object of interest) and send the output to an image processing system and to a comparator. As used herein, a corpus may refer to one or more data sources, such as a data source 1024 of FIG. 10. In some embodiments, data sources 1024 may include video libraries, data warehouses, information corpora, data models, and/or document repositories. In some embodiments, the data sources 1024 may include an information corpus 1026. The information corpus 1026 may enable data storage and retrieval. In some embodiments, the information corpus 1026 may be a subject repository that houses a standardized, consistent, clean, and integrated list of images and text. For example, an information corpus 1026 may include teaching presentations that include step by step images and comments on how to perform a function. Data may be sourced from various operational systems. Data stored in an information corpus 1026 may be structured in a way to specifically address reporting and analytic requirements. In some embodiments, an information corpus 1026 may be a relational database.

In some embodiments, a query module 1030 may be a computer module that identifies objects of interest within sections of a text, or other forms of data. In some embodiments, a query module 1030 may include a request feature identifier 1032 and a valuation identifier 1034. When a query is received by the natural language processing system 1012, the query module 1030 may be configured to analyze text using natural language processing to identify an object of interest. The query module 1030 may first identity one or more objects of interest in the text using the natural language processor 1014 and related subcomponents 1016-1022. After identifying the one or more objects of interest, the request feature identifier 1032 may identify one or more common objects of interest (e.g., anomalies, artificial content, natural data, etc.) present in sections of the text (e.g., the one or more text segments of the text). In some embodiments, the common objects of interest in the sections may be the same object of interest that is identified. Once a common object of interest is identified, the request feature identifier 1032 may be configured to transmit the text segments that include the common object of interest to an image processing system (shown in FIG. 9) and/or to a comparator.

After identifying common objects of interest using the request feature identifier 1032, the query module may group sections of text having common objects of interest. The valuation identifier 1034 may then provide a value to each text segment indicating how close the object of interest in each text segment is related to one another (and thus indicates artificial and/or real data). In some embodiments, the particular subject may have one or more of the common objects of interest identified in the one or more sections of text. After identifying a particular object of interest relating to the query (e.g., identifying that one or more of the common objects of interest may be an anomaly), the valuation identifier 1034 may be configured to transmit the criterion to an image processing system (shown in FIG. 9) and/or to a comparator (which may then determine the validity of the common and/or particular objects of interest).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
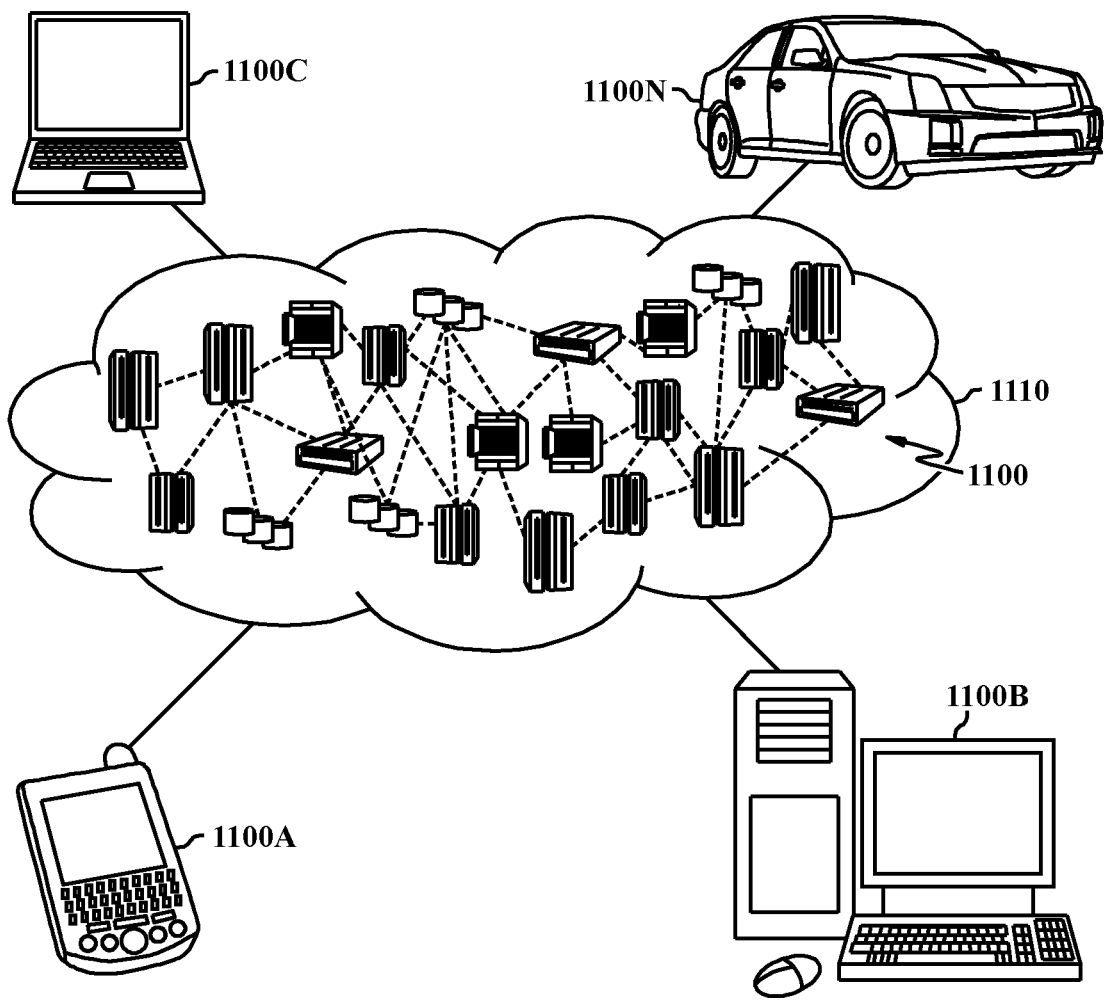
FIG. 11 illustrates a cloud computing environment, in accordance with embodiments of the present disclosure.

FIG. 11 illustrates a cloud computing environment 1110 in accordance with embodiments of the present disclosure. As shown, cloud computing environment 1110 includes one or more cloud computing nodes 1100 with which local computing devices used by cloud consumers such as, for example, personal digital assistant (PDA) or cellular telephone 1100A, desktop computer 1100B, laptop computer 1100C, and/or automobile computer system 1100N may communicate. Nodes 1100 may communicate with one another. They may be grouped (not shown) physically or virtually, in one or more networks, such as private, community, public, or hybrid clouds as described hereinabove, or a combination thereof.

This allows cloud computing environment 1110 to offer infrastructure, platforms, and/or software as services for which a cloud consumer does not need to maintain resources on a local computing device. It is understood that the types of computing devices 1100A-N shown in FIG. 11 are intended to be illustrative only and that computing nodes 1100 and cloud computing environment 1110 can communicate with any type of computerized device over any type of network and/or network addressable connection (e.g., using a web browser).

Figure 12:
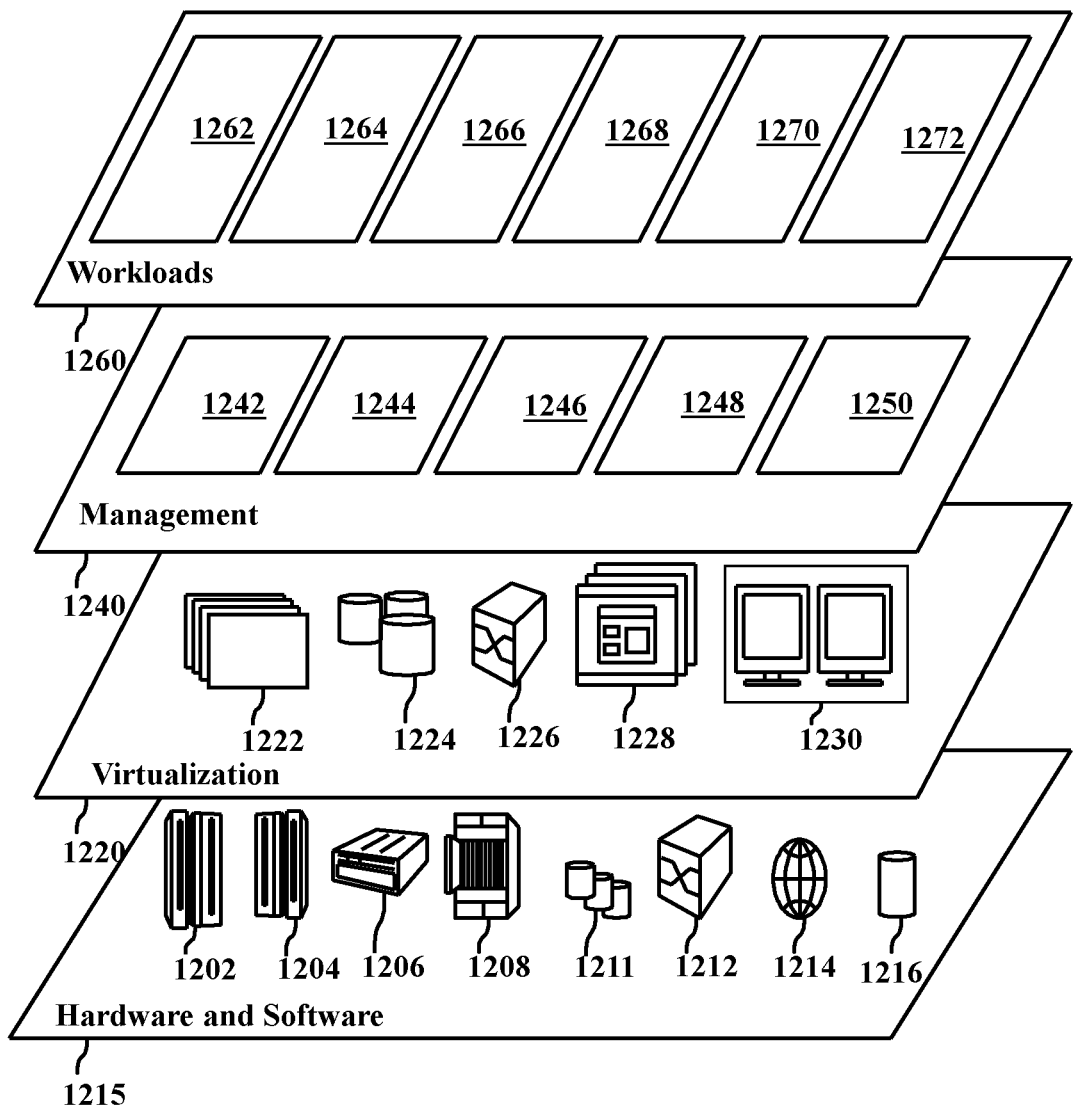
FIG. 12 depicts abstraction model layers, in accordance with embodiments of the present disclosure.

FIG. 12 illustrates abstraction model layers 1200 provided by cloud computing environment 1110 (FIG. 11) in accordance with embodiments of the present disclosure. It should be understood in advance that the components, layers, and functions shown in FIG. 12 are intended to be illustrative only and embodiments of the disclosure are not limited thereto. As depicted below, the following layers and corresponding functions are provided.

Hardware and software layer 1215 includes hardware and software components. Examples of hardware components include: mainframes 1202; RISC (Reduced Instruction Set Computer) architecture-based servers 1204; servers 1206; blade servers 1208; storage devices 1211; and networks and networking components 1212. In some embodiments, software components include network application server software 1214 and database software 1216.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1240 may provide the functions described below. Resource provisioning 1242 provides dynamic procurement of computing resources and other resources that are utilized to perform tasks within the cloud computing environment. Metering and pricing 1244 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 1246 provides access to the cloud computing environment for consumers and system administrators. Service level management 1248 provides cloud computing resource allocation and management such that required service levels are met. Service level agreement (SLA) planning and fulfillment 1250 provide pre-arrangement for, and procurement of, cloud computing resources for which a future requirement is anticipated in accordance with an SLA.

Workloads layer 1260 provides examples of functionality for which the cloud computing environment may be utilized. Examples of workloads and functions which may be provided from this layer include: mapping and navigation 1262; software development and lifecycle management 1264; virtual classroom education delivery 1266; data analytics processing 1268; transaction processing 1270; and artificial content identification using subset scanning over generative model activations 1272.

Figure 13:
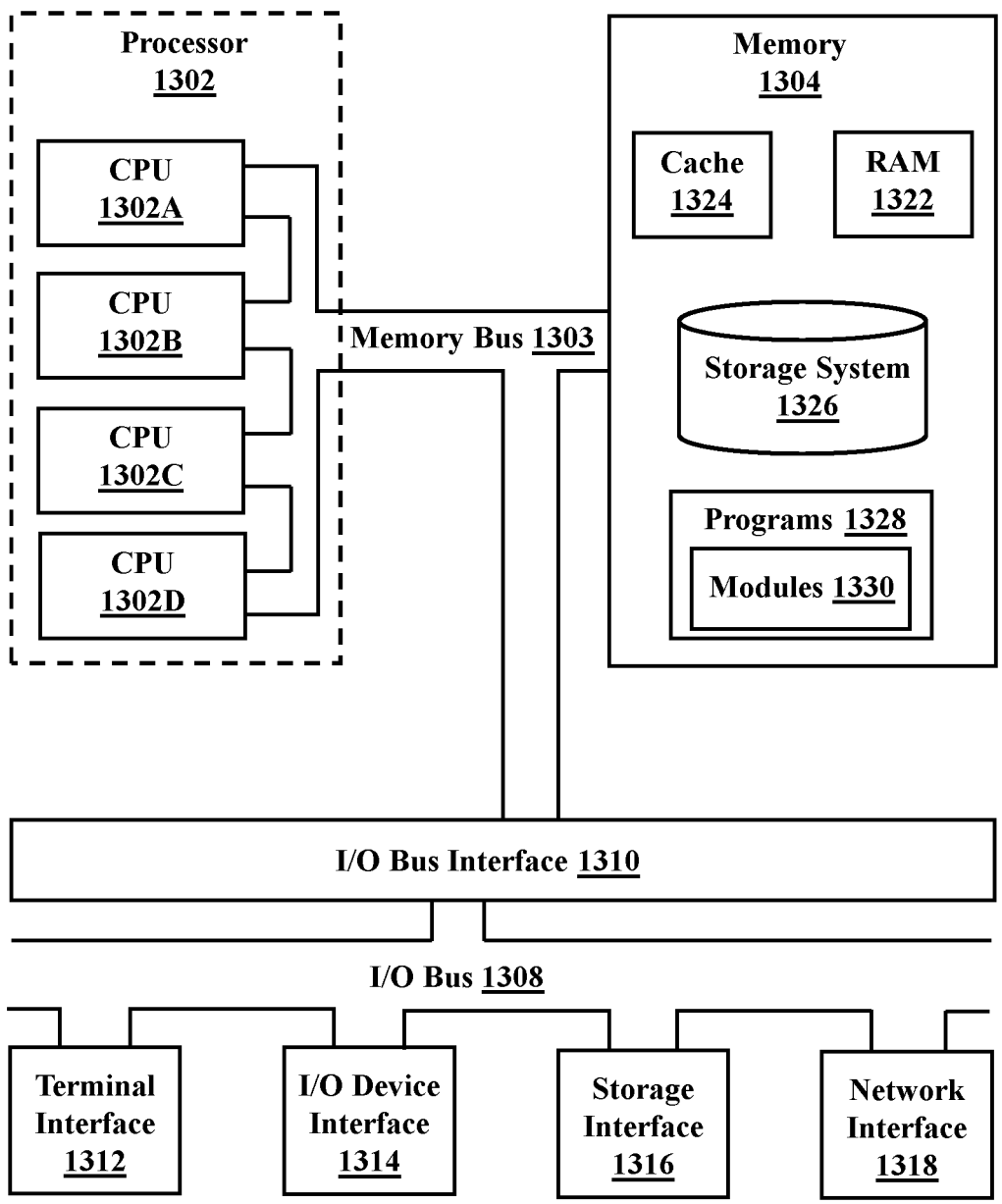
FIG. 13 illustrates a high-level block diagram of an example computer system that may be used in implementing one or more of the methods, tools, and modules, and any related functions, described herein, in accordance with embodiments of the present disclosure.

FIG. 13 illustrates a high-level block diagram of an example computer system 1301 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1301 may comprise a processor 1302 with one or more central processing units (CPUs) 1302A, 1302B, 1302C, and 1302D, a memory subsystem 1304, a terminal interface 1312, a storage interface 1316, an I/O (Input/Output) device interface 1314, and a network interface 1318, all of which may be communicatively coupled, directly or indirectly, for inter-component communication via a memory bus 1303, an I/O bus 1308, and an I/O bus interface unit 1310.

The computer system 1301 may contain one or more general-purpose programmable CPUs 1302A, 1302B, 1302C, and 1302D, herein generically referred to as the CPU 1302. In some embodiments, the computer system 1301 may contain multiple processors typical of a relatively large system; however, in other embodiments, the computer system 1301 may alternatively be a single CPU system. Each CPU 1302 may execute instructions stored in the memory subsystem 1304 and may include one or more levels of on-board cache.

System memory 1304 may include computer system readable media in the form of volatile memory, such as random access memory (RAM) 1322 or cache memory 1324. Computer system 1301 may further include other removable/non-removable, volatile/non-volatile computer system storage media. By way of example only, storage system 1326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1304 can include flash memory, e.g., a flash memory stick drive or a flash drive. Memory devices can be connected to memory bus 1303 by one or more data media interfaces. The memory 1304 may include at least one program product having a set (e.g., at least one) of program modules that are configured to carry out the functions of various embodiments.

One or more programs/utilities 1328, each having at least one set of program modules 830, may be stored in memory 1304. The programs/utilities 1328 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1328 and/or program modules 1330 generally perform the functions or methodologies of various embodiments.

Although the memory bus 1303 is shown in FIG. 13 as a single bus structure providing a direct communication path among the CPUs 1302, the memory subsystem 1304, and the I/O bus interface 1310, the memory bus 1303 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1310 and the I/O bus 1308 are shown as single respective units, the computer system 1301 may, in some embodiments, contain multiple I/O bus interface units 1310, multiple I/O buses 1308, or both. Further, while multiple I/O interface units 1310 are shown, which separate the I/O bus 1308 from various communications paths running to the various I/O devices, in other embodiments some or all of the I/O devices may be connected directly to one or more system I/O buses 1308.

In some embodiments, the computer system 1301 may be a multi-user mainframe computer system, a single-user system, a server computer, or similar device that has little or no direct user interface but receives requests from other computer systems (clients). Further, in some embodiments, the computer system 1301 may be implemented as a desktop computer, portable computer, laptop or notebook computer, tablet computer, pocket computer, telephone, smartphone, network switches or routers, or any other appropriate type of electronic device.

It is noted that FIG. 13 is intended to depict the representative major components of an exemplary computer system 1301. In some embodiments, however, individual components may have greater or lesser complexity than as represented in FIG. 13, components other than or in addition to those shown in FIG. 13 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A method for detecting specific content, said method comprising:
    extracting a group of activation nodes from a first machine learning model, wherein said first machine learning model is a discriminator of a generative adversarial network, wherein said discriminator is trained with natural data, wherein said generative adversarial network has a network structure, and wherein an arrangement of nodes and connections between said nodes defines said network structure;
    computing empirical p-values for said group of activation nodes;
    detecting anomalous nodes from said group of activation nodes based at least in part on a deviation of said empirical p-values from a uniform distribution;
    generating a first gradient mask with said anomalous nodes, wherein said first gradient mask is developed using a normal distribution;
    updating at least one portion of said generative adversarial network with said first gradient mask;
    updating said network structure to an updated network structure, wherein said updating said network structure includes changing said connections between said nodes; and
    using said updated network structure to enhance a process performed by said generative adversarial network.

2. The method of claim 1 further comprising:
    applying said first machine learning model on activation data; and
    displaying, on a graphical user interface to a user, a determination for said activation data.

3. The method of claim 1 wherein said updating of said generative adversarial network includes obtaining said anomalous nodes.

4. The method of claim 1 wherein said at least one process performed by said generative adversarial network is a data generation process, and wherein enhancing said data generation process comprises:
    extracting a discriminator structure from said discriminator in said generative adversarial network;
    applying a group-based subset scanning to obtain one or more metrics of said generative adversarial network;
    generating a second gradient mask with at least one metric of said one or more metrics of said generative adversarial network; and
    applying said second gradient mask to a generator of said generative adversarial network to enhance said data generation process.

5. The method of claim 1 wherein said at least one process performed by said generative adversarial network is a data classification process, and wherein enhancing said data classification process comprises:
    extracting a discriminator structure from said discriminator in said generative adversarial network;

applying a group-based subset scanning to obtain one or more metrics of said generative adversarial network;
generating a gradient mask with said one or more metrics of said generative adversarial network; and
applying said gradient mask to said discriminator to enhance said data classification process.

6. The method of claim 1 wherein said updating said network structure comprises:
extracting activations from a layer of said discriminator;
applying group-based subset scanning over said activations to obtain said anomalous nodes;
applying said first gradient mask to said discriminator; and
repeating said extracting activations, applying group-based subset scanning, generating gradient masks, and applying said gradient masks to said discriminator until a threshold is met.

7. The method of claim 1, further comprising:
training said first machine learning model with input data, wherein said input data is of a homogenous data type wherein said homogenous data type is selected from the group consisting of text, audio, image, and video.

8. A system for detecting specific content, said system comprising:
a memory; and
a processor in communication with said memory wherein said processor is configured to perform operations comprising:
extracting a group of activation nodes from a first machine learning model, wherein said first machine learning model is a discriminator of a generative adversarial network, wherein said discriminator is trained with natural data, wherein said generative adversarial network has a network structure, and wherein an arrangement of nodes and connections between said nodes defines said network structure;
computing empirical p-values for said group of activation nodes;
detecting anomalous nodes from said group of activation nodes based at least in part on a deviation of said empirical p-values from a uniform distribution;
generating a gradient mask with said anomalous nodes, wherein said gradient mask is developed using a normal distribution;
updating at least one portion of said generative adversarial network with said gradient mask;
updating said network structure to an updated network structure, wherein said updating said network structure includes changing said connections between said nodes; and
using said updated network structure to enhance a process performed by said generative adversarial network.

9. The system of claim 8 wherein the operations further comprise:
applying said first machine learning model on activation data; and
displaying, on a graphical user interface to a user, a determination for said activation data.

10. The system of claim 8 wherein said updating of said generative adversarial network includes obtaining said anomalous nodes.

11. The system of claim 8 wherein said updating said network structure comprises:
extracting activations from a layer of said discriminator;
applying group-based subset scanning over said activations to obtain said anomalous nodes;
applying said first gradient mask to said discriminator; and
repeating said extracting activations, applying group-based subset scanning, generating gradient masks, and applying said gradient masks to said discriminator until a threshold is met.

12. The system of claim 8, further comprising:
training said first machine learning model with input data, wherein said input data is of a homogenous data type wherein said homogenous data type is selected from the group consisting of text, audio, image, and video.

13. A computer program product for detecting specific content, said computer program product comprising a computer readable storage medium having program instructions embodied therewith, said program instructions executable by a processor to cause said processor to perform a function, said function comprising:
receiving, by said processor, input data;
training a first machine learning model with said input data to extract a group of activation nodes;
extracting a group of activation nodes from said first machine learning model, wherein said first machine learning model is a discriminator of a generative adversarial network, wherein said discriminator is trained with natural data, wherein said generative adversarial network has a network structure, and wherein an arrangement of nodes and connections between said nodes defines said network structure;
computing empirical p-values for said group of activation nodes;
detecting anomalous nodes from said group of activation nodes based at least in part on a deviation of said empirical p-values from a uniform distribution;
generating a gradient mask with said anomalous nodes, wherein said gradient mask is developed using a normal distribution;
updating at least one portion of said generative adversarial network with said gradient mask;
updating said network structure to an updated network structure, wherein said updating said network structure includes changing said connections between said nodes; and
using said updated network structure to enhance a process performed by said generative adversarial network.

14. The computer program product of claim 13 wherein said at least one process performed by said generative adversarial network is a data classification process, and wherein enhancing said data classification process comprises:
extracting a discriminator structure from said discriminator in said generative adversarial network;
applying a group-based subset scanning to obtain one or more metrics of said generative adversarial network;
generating a second gradient mask with at least one of said one or more metrics of said generative adversarial network; and
applying said second gradient mask to said discriminator to enhance said data classification process.

15. The computer program product of claim 13 wherein said updating said network structure comprises:
extracting activations from a layer of said discriminator;
applying group-based subset scanning over said activations to obtain said anomalous nodes;
applying said first gradient mask to said discriminator; and repeating said extracting activations, applying group-based subset scanning, generating gradient masks, and applying said gradient masks to said discriminator until a threshold is met.

16. The method of claim 1, wherein said gradient mask is generated with a natural distribution of said anomalous nodes.

17. The method of claim 1, further comprising:
applying subset scanning over said group of activation nodes; and
iterating said subset scanning until achieving a convergence.

18. The method of claim 1, further comprising:
applying subset scanning over said group of activation nodes to obtain said anomalous nodes.

19. The method of claim 1 wherein said discriminator is trained only with natural data.

20. The method of claim 1 wherein said detecting anomalous nodes from said group of activation nodes comprises:
using group-based subset scanning over said activation nodes.

* * * * *